(12) United States Patent
Sun et al.

(10) Patent No.: US 11,788,010 B2
(45) Date of Patent: Oct. 17, 2023

(54) LIQUID CRYSTAL COMPOSITION AND LIQUID CRYSTAL DISPLAY DEVICE COMPRISING THE SAME

(71) Applicant: Jiangsu Hecheng Display Technology Co., Ltd., Nanjing (CN)

(72) Inventors: Chenglong Sun, Nanjing (CN); Yafei Yang, Nanjing (CN); Tengyun Zhao, Nanjing (CN); Rongrong Li, Nanjing (CN); Huijuan Dai, Nanjing (CN); Panpan Wang, Nanjing (CN); Di He, Nanjing (CN); Wenquan Ding, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

(21) Appl. No.: 17/973,646

(22) Filed: Oct. 26, 2022

(65) Prior Publication Data
US 2023/0159826 A1  May 25, 2023

(30) Foreign Application Priority Data
Nov. 1, 2021 (CN) .......................... 202111283469.7

(51) Int. Cl.
G02F 1/1333 (2006.01)
C09K 19/34 (2006.01)

(52) U.S. Cl.
CPC ...... *C09K 19/3491* (2013.01); *C09K 19/3405* (2013.01); *C09K 2019/3408* (2013.01)

(58) Field of Classification Search
CPC ............ C09K 19/3491; C09K 19/3405; C09K 19/12; C09K 19/14; C09K 19/16; C09K 19/18; C09K 19/20; C09K 19/30; C09K 19/34; C09K 19/3066; C09K 19/3402; C09K 19/42; C09K 2019/3408; C09K 2019/0444; C09K 2019/123; C09K 2019/3009; C09K 2019/3021; C09K 2019/301; C09K 2019/3004; C09K 2019/3016; C09K 2019/3019; C09K 2019/0466; C09K 2019/3422; G02F 1/1333
See application file for complete search history.

(56) References Cited

U.S. PATENT DOCUMENTS 7,018,685 B2  3/2006  Schmidt et al.
7,514,127 B2  4/2009  Lietzau et al.
2015/0299574 A1  10/2015  Hirschmann et al.
2016/0215214 A1  7/2016  Jeong et al.
2018/0112132 A1  4/2018  Li et al.
2020/0032143 A1* 1/2020  Takata ................... C09K 19/42
2021/0139451 A1* 5/2021  Lietzau ................. C09K 19/32
2023/0159826 A1* 5/2023  Sun ..................... C09K 19/3491
                                                                  252/299.61

FOREIGN PATENT DOCUMENTS

| CN | 1942461 A   | 4/2007 |
| CN | 105820824 A | 8/2016 |
| CN | 107973766 A | 5/2018 |
| CN | 110577838 A | 12/2019 |
| DE | 10101022 A1 | 7/2002 |

* cited by examiner

*Primary Examiner* — Geraldina Visconti

(74) *Attorney, Agent, or Firm* — Hoffmann & Baron, LLP

(57) ABSTRACT

A liquid crystal composition includes at least one compound of general formula F and at least one compound of general formula N. A liquid crystal display device includes the liquid crystal composition. The liquid crystal composition has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy, such that the liquid crystal display device including the liquid crystal composition has a better contrast, a wider temperature range for application, a faster response speed, a better contrast and a higher reliability.

11 Claims, No Drawings

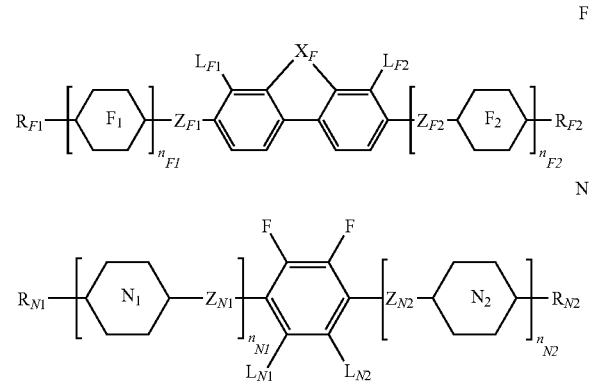

LIQUID CRYSTAL COMPOSITION AND LIQUID CRYSTAL DISPLAY DEVICE COMPRISING THE SAME

TECHNICAL FIELD

The present invention relates to the field of liquid crystal, specifically to a liquid crystal composition and a liquid crystal display device comprising said liquid crystal composition.

BACKGROUND ARTS

Liquid crystal display elements can be used in all kinds of domestic electrical apparatuses, measuring apparatuses, automotive panels, word processors, computers, printers, televisions and so forth, such as clocks and calculators. According to the types of display mode, liquid crystal display elements can be classified into PC (phase change), TN (twisted nematic), STN (super twisted nematic), ECB (electrically controlled birefringence), OCB (optically compensated bend), IPS (in-plane switching), VA (vertical alignment) and so forth. According to the driving modes of elements, liquid crystal display elements can be classified into PM (passive matrix) type and AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high-temperature type and a low-temperature type according to the manufacturing process. According to the types of light source, liquid crystal display elements can be classified into a reflection type utilizing a natural light, a transmission type utilizing a backlight, and a semi-transmission type utilizing both the natural light and the backlight.

A liquid crystal display device includes a liquid crystal composition having a nematic phase. The composition has appropriate characteristics. An AM device having good characteristics can be obtained via improving the characteristics of the composition. The correlation between the characteristics of composition and characteristics of AM device is summarized in Table 1 below.

TABLE 1

Characteristics of composition and AM device

| No. | Characteristics of composition | Characteristics of AM device |
|---|---|---|
| 1 | Wide temperature range of a nematic phase | Wide workable temperature range |
| 2 | Small viscosity | Short response time |
| 3 | Appropriate optical anisotropy | Large contrast |
| 4 | Large absolute value of positive or negative dielectric anisotropy | Low threshold voltage, small electric power consumption, large contrast |
| 5 | Large specific resistance | Large voltage holding ratio, large contrast |
| 6 | Ultraviolet light and heat stabilities | Long service life |
| 7 | Large elastic constant | Large contrast, short response time |

In the application of liquid crystal display devices, the impact of contrast on the visual effect is very critical. Generally speaking, the larger the contrast is, the clearer and more eye-catching the image will be, and the more vibrant and gorgeous the colors will be. And if the contrast is small, the whole picture becomes gray and dull. High contrast is of great help for image clarity, detail performance, gray level performance. High contrast products have advantages in black and white contrast, clarity, integrity and so forth. Contrast also has a great impact on the display effect of dynamic video. The light-dark conversion in the dynamic image is fast, therefore, the higher the contrast is, the easier it is for the human eyes to distinguish such a conversion process.

In order to improve the response speed of liquid crystal display devices, the rotational viscosity of liquid crystal needs to be reduced as much as possible. However, the liquid crystal materials with low viscosity generally have lower clearing point, lower optical anisotropy, lower absolute value of dielectric anisotropy and so forth. Therefore, when modulating the formulation of hybrid liquid crystal, the performance requirements of other aspects need to be considered while reducing the viscosity.

The threshold voltage of the hybrid liquid crystal mainly depends on the $\Delta\varepsilon$ of the liquid crystal. A large $\Delta\varepsilon$ is beneficial to reduce the threshold voltage of the liquid crystal, and the $\Delta\varepsilon$ of the hybrid liquid crystal is modulated to a suitable value to adapt to the working voltage of the display device by mixing liquid crystal monomers of different polarity. However, improving the $\Delta\varepsilon$ of the liquid crystal may increase the viscosity of the liquid crystal and reduce the stability of the liquid crystal.

With the improvement of the resolution of the liquid crystal display, liquid crystal displays with 4K and 8K type resolution are gradually emerging, which then require liquid crystal display panel to have smaller opening rate and higher transmittance. Negative liquid crystal compositions have higher transmittance and the advantage of high transmittance is more remarkable especially in PSA mode and NFFS mode. However, the structure of negative liquid crystal determines that it has larger rotational viscosity, higher ion concentration, and lower voltage hold rate, resulting in the effect of residual image of negative liquid crystal being significantly inferior to positive liquid crystal. Thus, there is an urgent need to develop a negative liquid crystal composition with smaller rotational viscosity and higher voltage hold rate to overcome the deficiencies of negative liquid crystals and provide liquid crystal compositions that meet the market requirement.

Chinese patent application CN1942461A and German patent application DE10101022A1 disclose a liquid crystal compound that can solve the above problems to a certain extent. Based on the prior art, Chinese patent application CN107973766A conducts ring substitution on the end group structure of such compounds. However, the currently disclosed compounds of this type have the problems of small absolute value of dielectric anisotropy, large rotational viscosity, low voltage hold rate and poor solubility at low temperature. Chinese patent applications CN105820824A and CN110577838A disclose a dibenzothiophene/furan liquid crystal composition, which solves the above problems to a certain extent, but it still has higher rotational viscosity, lower VHR (especially lower VHR (UV)). It is well known that the liquid crystal display panel needs to be exposed to a certain degree of UV light irradiation during manufacturing process, and the photometry of UV light with a wavelength of 365 nm is generally about 6000~1000 MJ. The conventional dibenzofuran and dibenzothiophene compounds have a lower VHR (UV) after UV light irradiation, which makes the reliability of the display reduced and produces residual image.

Many physical parameters of liquid crystal should be adjusted at the same time of modulating the hybrid liquid crystal formulation. It is impossible to adjust one performance parameter without affecting the value of another parameter, sometimes adding a certain liquid crystal monomer to adjust a certain performance parameter of hybrid liquid crystal may be beneficial to one or several other performance parameters, but may be detrimental to the improvement of some other performance parameters. Therefore, how to obtain a liquid crystal composition that can solve or partially solve the above problem remains an urgent problem to be solved in this field.

SUMMARY OF THE INVENTION

Objects: In view of the deficiencies in the prior art, it is an object of the present invention to provide a liquid crystal composition, which has a larger K value, a smaller rotational viscosity, a higher VHR value, a longer low temperature storage time and a shorter response time while maintaining an appropriate clearing point, an appropriate optical anisotropy and an appropriate absolute value of dielectric anisotropy.

Another object of the present invention is to provide a liquid crystal display device comprising the above liquid crystal composition.

Technical solutions: To realize the above invention objects, the present invention provides a liquid crystal composition comprising:

at least one compound of general formula F

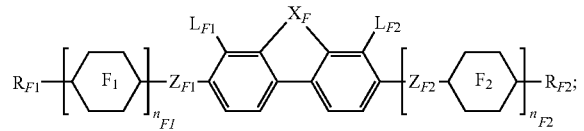

F at least one compound of general formula N in an amount of 10%-45% by weight of the total weight of the liquid crystal composition

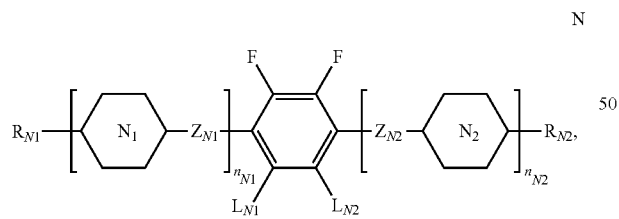

N wherein, $R_{F1}$ represents —H, halogen, $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

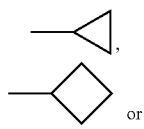

or

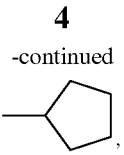

, one or more nonadjacent —$CH_2$— in the $C_{1-12}$ linear or branched alkyl can each be independently replaced by —C≡C—, —O—, —CO—, —CO—O— or —O—CO—, and one or more —H in the $C_{1-12}$ linear or branched alkyl can each be independently substituted by —F or —Cl;

$R_{F2}$ represents

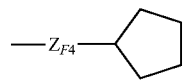

of which at least one single bond in the ring is replaced by double bond or

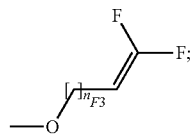

;

$R_{N1}$ and $R_{N2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

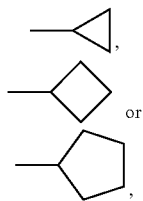

, one or more nonadjacent —$CH_2$— in the $C_{1-12}$ linear or branched alkyl can each be independently replaced by —CH=CH—, —C≡C—, —O—, —CO—, —CO—O— or —O—CO—;

ring

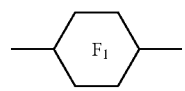

and ring

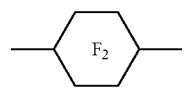

each independently represents

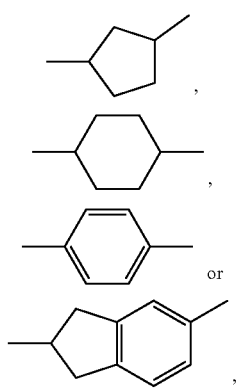

wherein one or more —CH₂— in

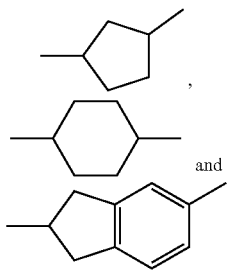

and can be replaced by —O—, one or more single bond in the rings can be replaced by double bond, wherein one or more —H on

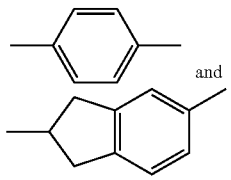

can each be independently substituted by —CN, —F or —Cl, and one or more —CH= in the rings can be replaced by —N=;

ring

and ring

each independently represents

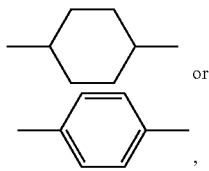

wherein one or more —CH₂— in

can be replaced by —O—, one or more single bond in the rings can be replaced by double bond, wherein one or more —H on

can be substituted by —F, —Cl or —CN, and one or more —CH= in the rings can be replaced by —N=;
$X_F$ represents —O—, —S— or —CO—;
$L_{F1}$ and $L_{F2}$ each independently represents —H, —F, —Cl, —CF₃ or —OCF₃;
$L_{N1}$ and $L_{N2}$ each independently represents —H, $C_{1-3}$ alkyl or halogen;
$Z_{F1}$, $Z_{F2}$, $Z_{F4}$, $Z_{N1}$ and $Z_{N2}$ each independently represents single bond, —O—, —CO—O—, —O—CO—, —CH₂O—, —OCH₂—, —CH=CH—, —C≡C—, —CH₂CH₂—, —CF₂CF₂—, —(CH₂)₄—, —CF₂O— or —OCF₂—;
$n_{F1}$ and $n_{F2}$ each independently represents 0, 1 or 2, wherein, when $n_{F1}$ represents 2, ring

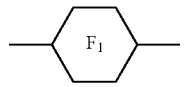

can be same or different, when $n_{F2}$ represents 2, ring

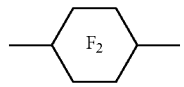

can be same or different, and $Z_F2$ can be same or different;
$n_{F3}$ represents an integer of 0-4; and
$n_{N1}$ represents 0, 1, 2 or 3, $n_{N2}$ represents 0 or 1, and $0 \leq n_{N1}+n_{N2} \leq 3$, when $n_{N1}=2$ or 3, ring

can be same or different, and $Z_{N1}$ can be same or different.

In some embodiments of the present invention, preferably, $L_{F1}$ and $L_{F2}$ each independently represents —F or —Cl.
In some embodiments of the present invention, the compound of general formula F is selected from a group consisting of the following compounds:
F-1
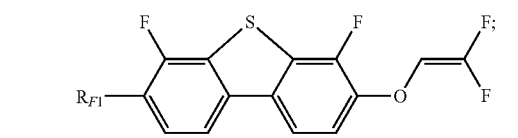
F-2
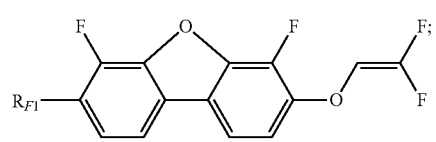
F-3
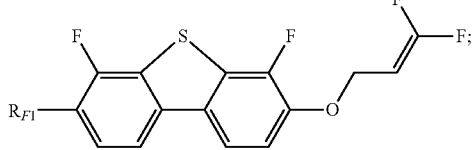
F-4
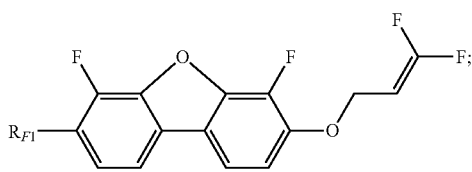
F-5
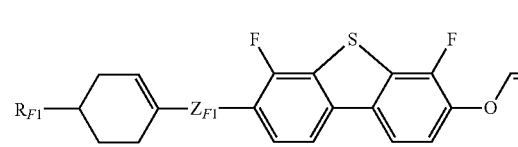
F-6
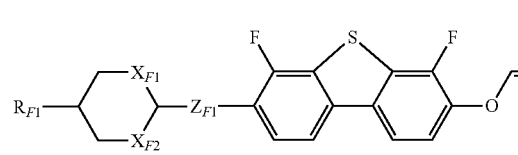
F-7
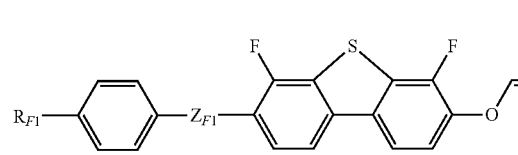
F-8
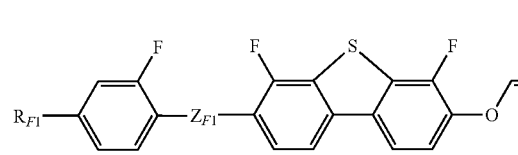
F-9
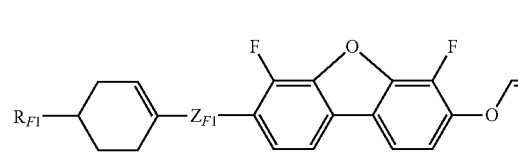
-continued
F-10
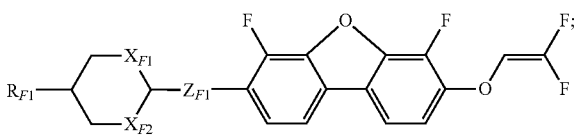
F-11
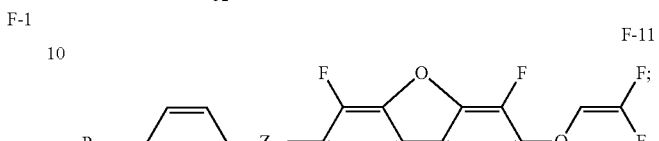
F-12
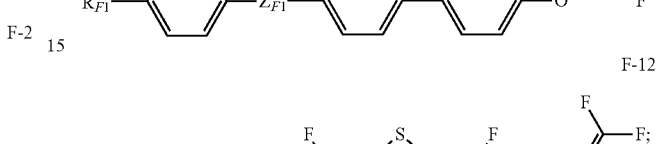
F-13
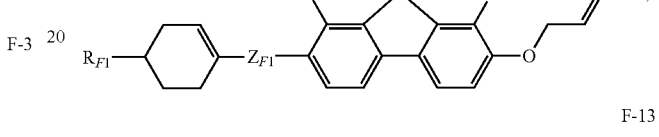
F-14
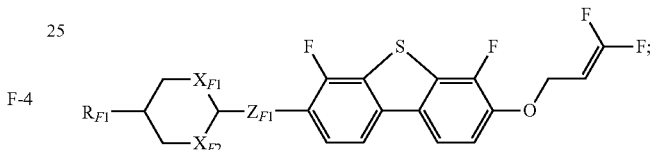
F-15
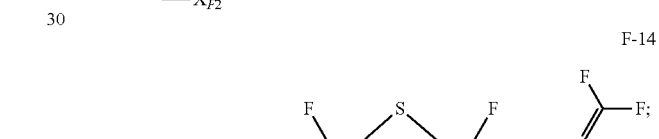
F-16
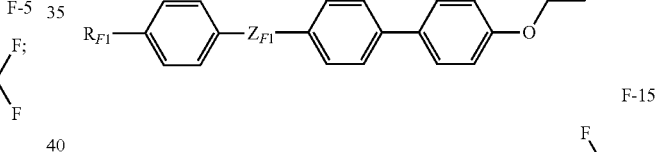
F-17
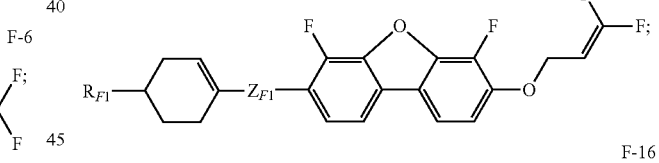
F-18
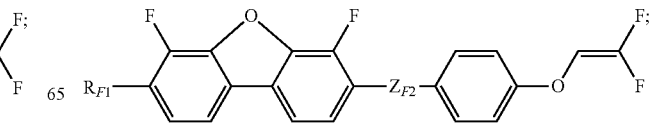

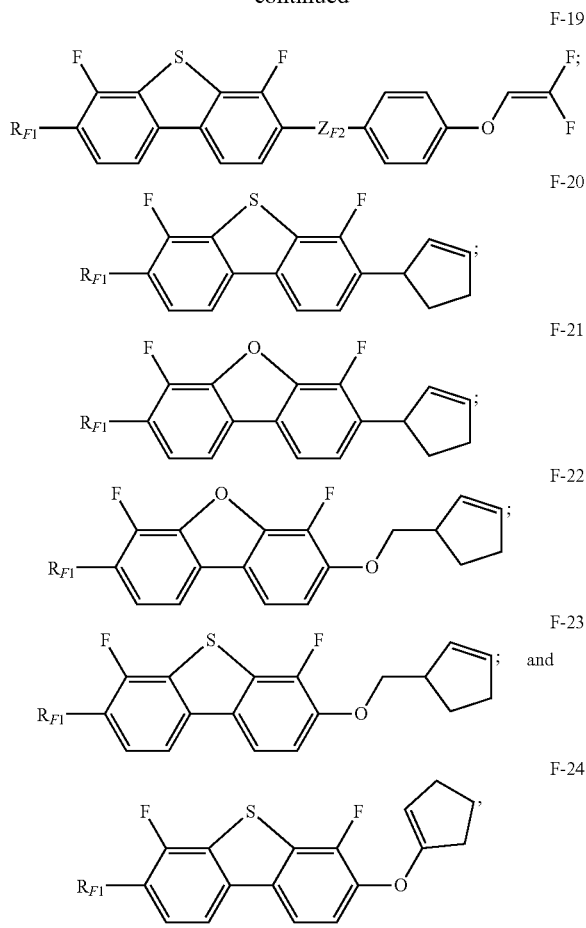

wherein, $X_{F1}$ and $X_{F2}$ each independently represents —$CH_2$— or —O—.

In some embodiments of the present invention, preferably, $n_{F3}$ represents 0.

In some embodiments of the present invention, preferably, $Z_{F1}$ and $Z_{F2}$ each independently represents single bond, —$CH_2O$— or —$OCH_2$—, further preferably, both $Z_{F1}$ and $Z_{F2}$ represent single bond.

In some embodiments of the present invention, both $n_{F1}$ and $n_{F2}$ represent 0.

In some embodiments of the present invention, preferably, $R_{F1}$ represents $C_{1-10}$ linear or branched alkyl, or $C_{1-9}$ linear or branched alkoxy; further preferably, $R_{F1}$ represents $C_{1-8}$ linear or branched alkyl, or $C_{1-7}$ linear or branched alkoxy.

In some embodiments of the present invention, in the compound of general formula F-1, the compound of general formula F-2, the compound of general formula F-3, the compound of general formula F-4, the compound of general formula F-18, the compound of general formula F-19, the compound of general formula F-20, the compound of general formula F-21, the compound of general formula F-22, the compound of general formula F-23, the compound of general formula F-24, $R_{F1}$ represents $C_{1-7}$ linear or branched alkoxy.

In some embodiments of the present invention, in order to make the liquid crystal composition have an appropriate clearing point, an appropriate optical anisotropy, and an appropriate absolute value of dielectric anisotropy, a larger K value, a smaller rotational viscosity, a higher VHR value, a longer low temperature storage time and a shorter response time, the compound of general formula F is selected from a group consisting of the compound of general formula F-1, the compound of general formula F-2, the compound of general formula F-20, and the compound of general formula F-21.

In some embodiments of the present invention, adjusting the content of compound of general formula F is preferred such that the liquid crystal composition of the present invention has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy.

In some embodiments of the present invention, the compound of general formula F provides 0.1-30 wt. % of the total weight of the liquid crystal composition, for example, 0.1 wt. %, 0.5 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %; preferably, the compound of general formula F provides 0.1-20 wt. % of the total weight of the liquid crystal composition.

In some embodiments of the present invention, in order to achieve a larger K value, a smaller rotational viscosity, a higher VHR value, a longer low temperature storage time and a shorter response time, the liquid crystal composition preferably comprises at least two compounds of general formula F.

In some embodiments of the present invention, both $L_{N1}$ and $L_{N2}$ represent —H.

In some embodiments of the present invention, the compound of general formula N is selected from a group consisting of the following compounds:

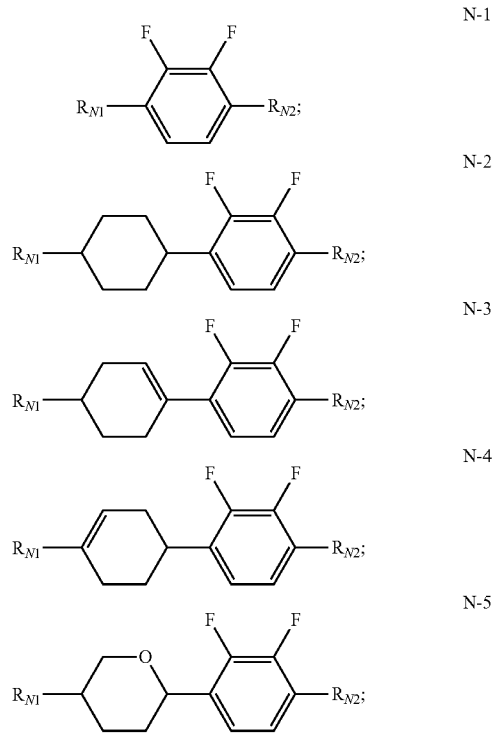

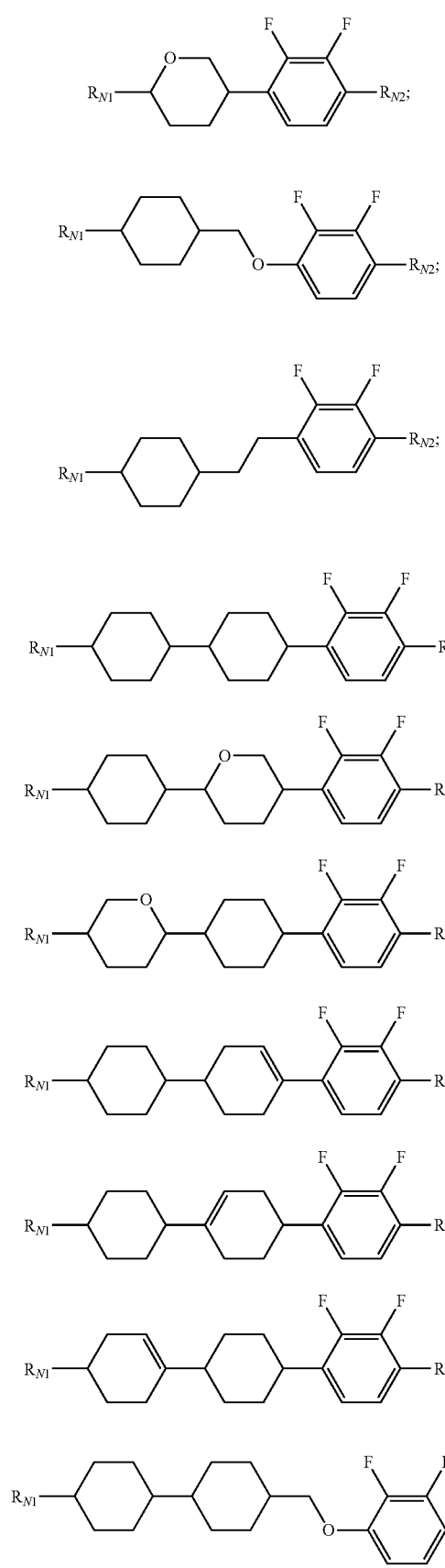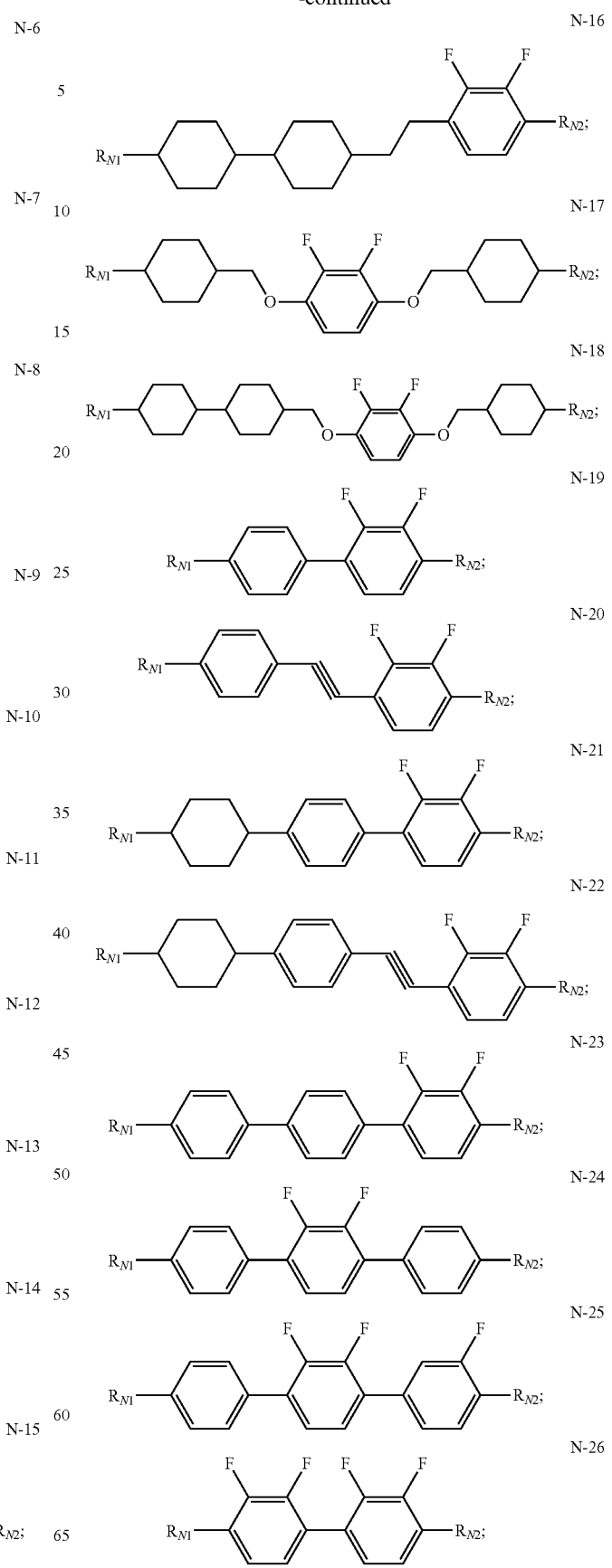

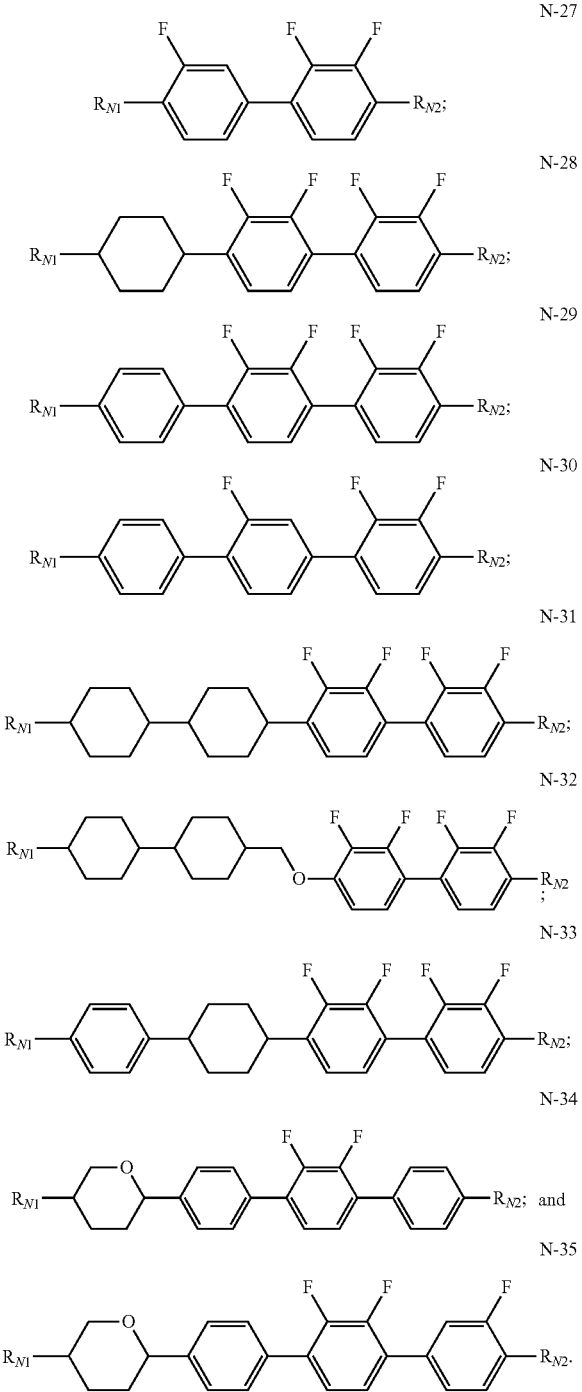

In some embodiments of the present invention, the lower limit and the upper limit of the content of the compound of general formula N are preferably lower when it is desired to maintain the liquid crystal composition of the present invention with a lower viscosity and a shorter response time; further, the lower limit and the upper limit of the content of the compound of general formula N are preferably lower when it is desired to maintain the liquid crystal composition of the present invention with a higher clearing point and a better temperature stability; in addition, the lower limit and the upper limit of the content of the compound of general formula N are preferably increased in order to maintain the driving voltage lower and make the absolute value of the dielectric anisotropy larger.

In some embodiments of the present invention, preferably, $R_{N1}$ and $R_{N2}$ each independently represents $C_{1-10}$ linear or branched alkyl, $C_{1-9}$ linear or branched alkoxy, or $C_{2-10}$ linear or branched alkenyl; further preferably, $R_{N1}$ and $R_{N2}$ each independently represents $C_{1-8}$ linear or branched alkyl, $C_{1-7}$ linear or branched alkoxy, or $C_{2-8}$ linear or branched alkenyl.

In some embodiments of the present invention, the compound of general formula N is selected from a group consisting of the compound of general formula N-1, the compound of general formula N-2, the compound of general formula N-3, the compound of general formula N-7, the compound of general formula N-9, the compound of general formula N-12, the compound of general formula N-13, the compound of general formula N-15, the compound of general formula N-19, the compound of general formula N-21, the compound of general formula N-24, the compound of general formula N-27, and the compound of general formula N-30.

In some embodiments of the present invention, in order to achieve a larger K value, a smaller rotational viscosity, a higher VHR value, a longer low temperature storage time and a shorter response time, the compound of general formula N is selected from a group consisting of the compound of general formula N-2, the compound of general formula N-3, the compound of general formula N-9, the compound of general formula N-12, and the compound of general formula N-13.

In some embodiments of the present invention, in order to achieve a larger K value, a smaller rotational viscosity, a higher VHR value, a longer low temperature storage time and a shorter response time, the compound of general formula N is selected from a group consisting of the compound of general formula N-1, the compound of general formula N-19, the compound of general formula N-21, the compound of general formula N-24, the compound of general formula N-27, and the compound of general formula N-30.

In some embodiments of the present invention, in order to achieve a larger K value, a smaller rotational viscosity, a higher VHR value, a longer low temperature storage time and a shorter response time, the compound of general formula N is selected from a group consisting of the compound of general formula N-2, the compound of general formula N-7, the compound of general formula N-9, the compound of general formula N-12, the compound of general formula N-15, the compound of general formula N-19, and the compound of general formula N-21.

In some embodiments of the present invention, adjusting the content of compound of general formula N is preferred such that the liquid crystal composition of the present invention has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy.

In some embodiments of the present invention, the compound of general formula N provides 10.1-45 wt. % of the total weight of the liquid crystal composition; for example, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %; preferably, the compound of general formula N provides 15-45 wt. % of the total weight of the liquid crystal composition.

After a large number of experimental studies, it is found in the present invention: when the compound of general formula N provides less than 10 wt. % of the total weight of the liquid crystal composition, and is used together with the compound of general formula F of the present invention, the performance (such as VHR (initial), VHR (UV), VHR (Ra), the low temperature storage time and the response time) of the consisted liquid crystal composition is significantly inferior to the present invention.

After a large number of experimental studies, it is found in the present invention: when the compound of general formula N provides greater than 45 wt. % of the total weight of the liquid crystal composition, and is used together with the compound of general formula F of the present invention, the performance (such as VHR (initial), VHR (UV), VHR (Ra), the low temperature storage time and the response time) of the consisted liquid crystal composition is significantly inferior to the present invention.

In some embodiments of the present invention, the liquid crystal composition comprises at least one compound of general formula M:

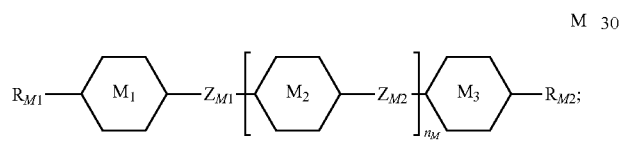

M wherein, $R_{M1}$ and $R_{M2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

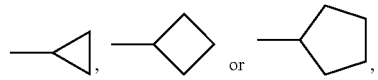

one or more nonadjacent —$CH_2$— in the $C_{1-12}$ linear or branched alkyl can each be independently replaced by —CH=CH—, —C≡C—, —O—, —CO—, —CO—O— or —O—CO—;

ring

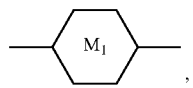

ring

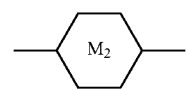

and ring

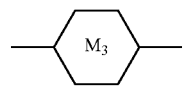

each independently represents

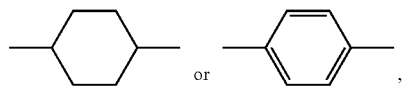

wherein one or more —$CH_2$— in

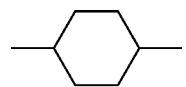

can be replaced by —O—, one or more single bond the rings can be replaced by double bond, at most one —H on

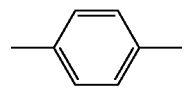

can be substituted by halogen;

$Z_{M1}$ and $Z_{M2}$ each independently represents single bond, —CO—O—, —O—CO—, —$CH_2$O—, —O$CH_2$—, —C≡C—, —CH=CH—, —$CH_2CH_2$— or —$(CH_2)_4$—; and $n_M$ represents 0, 1 or 2, wherein when $n_M$=2, ring

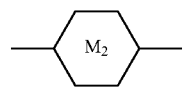

can be same or different, and $Z_{M2}$ can be same or different.

In some embodiments of the present invention, preferably, $R_{M1}$ and $R_{M2}$ each independently represents $C_{1-10}$ linear or branched alkyl, $C_{1-9}$ linear or branched alkoxy, or $C_{2-10}$ linear or branched alkenyl; further preferably, $R_{M1}$ and $R_{M2}$ each independently represents $C_{1-8}$ linear or branched alkyl, $C_{1-7}$ linear or branched alkoxy, or $C_{2-8}$ linear or branched alkenyl.

In some embodiments of the present invention, $R_{M1}$ and $R_{M2}$ preferably each independently represents $C_{2-8}$ linear alkenyl; $R_{M1}$ and $R_{M2}$ further preferably each independently represents $C_{2-5}$ linear alkenyl.

In some embodiments of the present invention, preferably, one of $R_{M1}$ and $R_{M2}$ is $C_{2-5}$ linear alkenyl and the other is $C_{1-5}$ linear alkyl.

In some embodiments of the present invention, preferably, $R_{M1}$ and $R_{M2}$ each independently represents $C_{1-8}$ linear alkoxy; further preferably, $R_{M1}$ and $R_{M2}$ each independently represents $C_{1-5}$ linear alkoxy.

In some embodiments of the present invention, preferably, one of $R_{M1}$ and $R_{M2}$ is $C_{1-5}$ linear alkoxy and the other is $C_{1-5}$ linear alkyl.

In some embodiments of the present invention, with emphasis in reliability, both $R_{M1}$ and $R_{M2}$ are preferably alkyl; with emphasis in reducing the volatility of the compound, both $R_{M1}$ and $R_{M2}$ are preferably alkoxy; and with emphasis in reducing the viscosity, at least one of $R_{M1}$ and $R_{M2}$ is preferably alkenyl.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

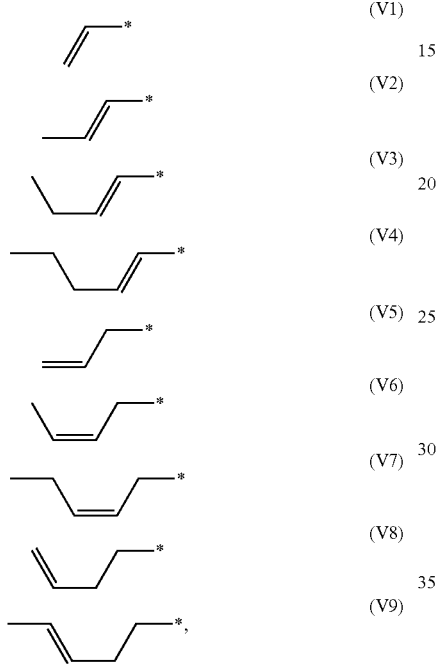

in which, * represents linking site that is bound in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

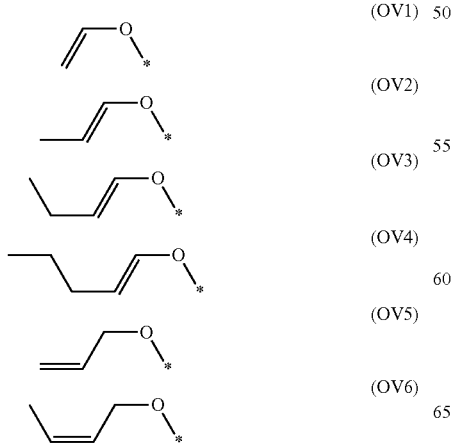

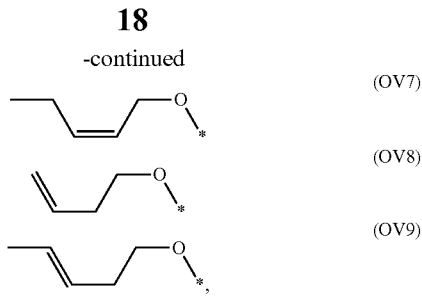

in which, * represents linking site that is bound in the ring structure.

In some embodiments of the present invention, the compound of general formula M is selected from a group consisting of the following compounds:

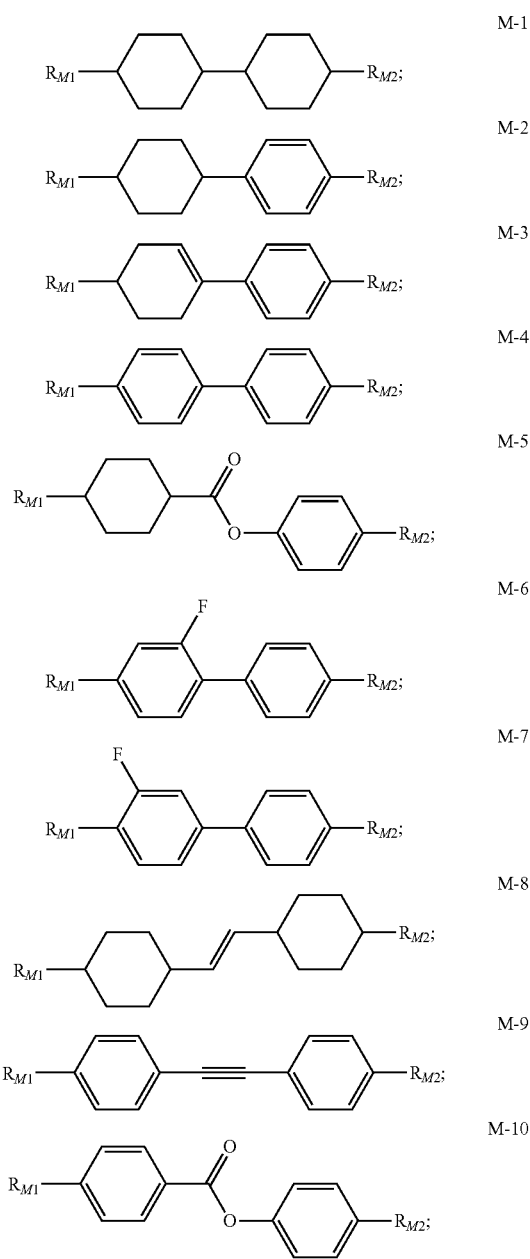

-continued

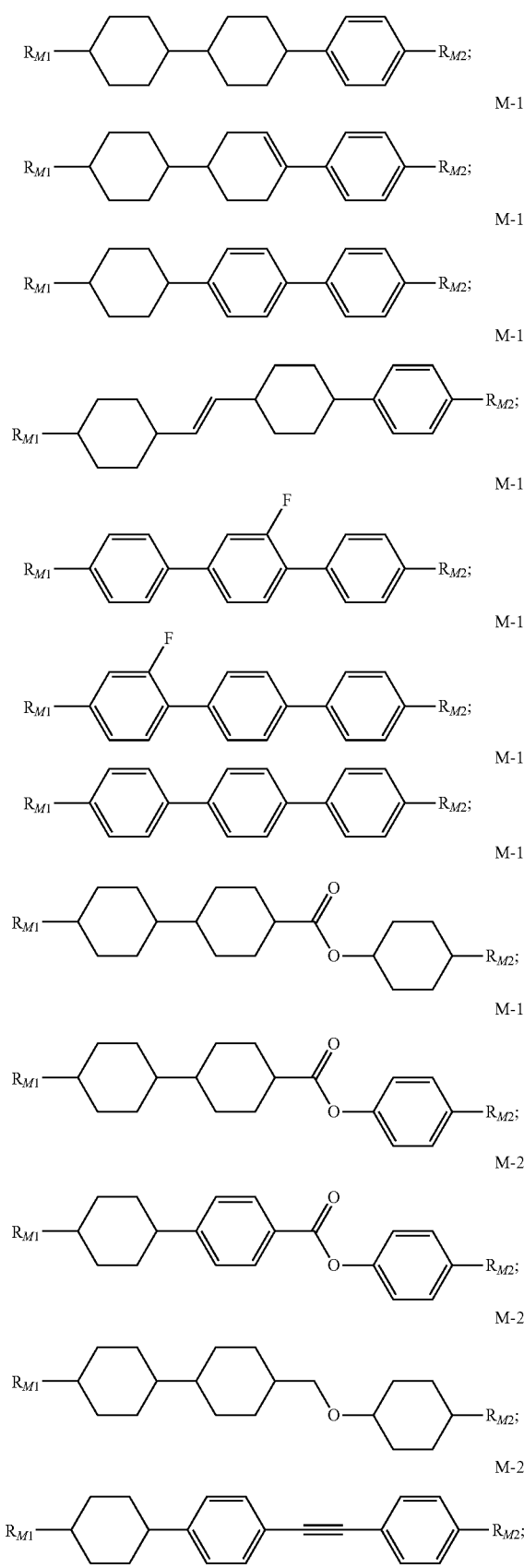
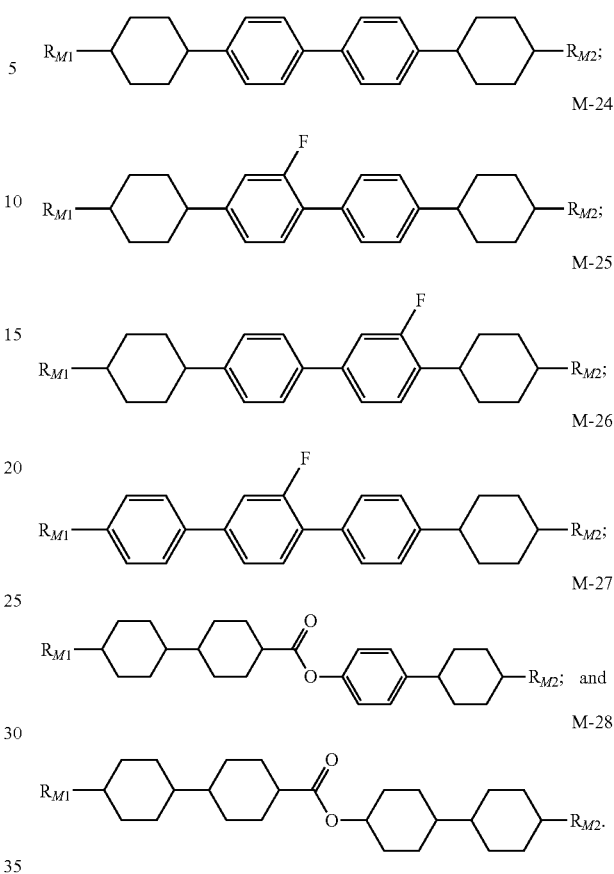

In some embodiments of the present invention, in order to achieve a larger K value, a smaller rotational viscosity, a higher VHR value, a longer low temperature storage time and a shorter response time, the compound of general formula M is selected from a group consisting of the compound of general formula M-1, the compound of general formula M-2, the compound of general formula M-4, the compound of general formula M-11 and the compound of general formula M-13.

In some embodiments of the present invention, the content of the compound of general formula M must be appropriately adjusted depending on the required performance such as low temperature solubility, transition temperature, electrical reliability, birefringence index, process adaptability, drop trace, "burn-in", dielectric anisotropy and so on.

The lower limit and the upper limit of the content of the compound of general formula M are preferably higher when it is desired to maintain the liquid crystal composition of the present invention with a lower viscosity and a shorter response time; further, the lower limit and the upper limit of the content of the compound of general formula M are preferably higher when it is desired to maintain the liquid crystal composition of the present invention with a higher clearing point and a good temperature stability; the lower limit and the upper limit of the content of the compound of general formula M are preferably decreased in order to maintain the driving voltage lower and make the absolute value of the dielectric anisotropy larger.

In some embodiments of the present invention, adjusting the content of compound of general formula M is preferred such that the liquid crystal composition of the present invention has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy.

In some embodiments of the present invention, the compound of general formula M provides 0.1-70 wt. % of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, 60 wt. %, 62 wt. %, 64 wt. %, 66 wt. %, 68 wt. %, 70 wt. %.

In some embodiments of the present invention, in order to apply the liquid crystal composition of the present invention into high-transmission liquid crystal display, the liquid crystal composition of the present invention further comprises at least one compound selected from a group consisting of compounds of general formula A-1 and general formula A-2

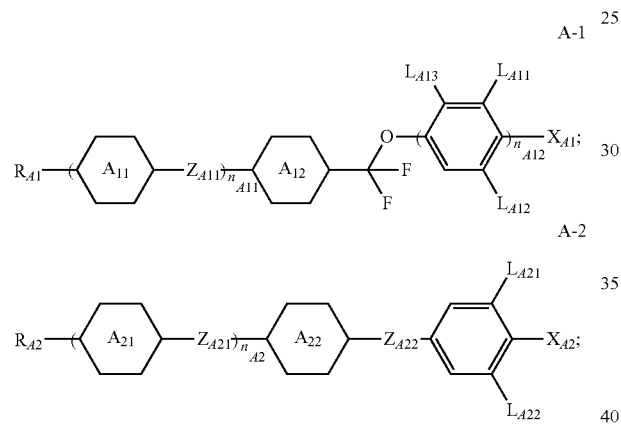

wherein, $R_{A1}$ and $R_{A2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

one or more nonadjacent —$CH_2$— in the $C_{1-12}$ linear or branched alkyl can each be independently replaced by —CH=CH—, —C≡C—, —O—, —CO—, —CO—O—, or —O—CO—, and one or more —H in the $C_{1-12}$ linear or branched alkyl,

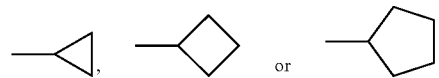

can each be independently substituted by —F or —Cl;

ring

ring

ring

and ring

each independently represents

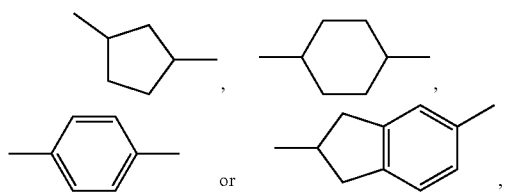

wherein one or more —$CH_2$— in

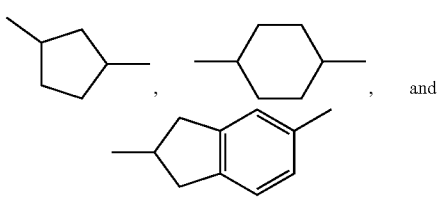

can be replaced by —O—, one or more single bond in the rings can be replaced by double bond, wherein one or more —H on

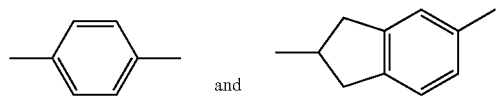

and can be substituted by —F, —Cl or —CN, one or more —CH= in the rings can be replaced by —N=; $Z_{A11}$, $Z_{A21}$ and $Z_{A22}$ each independently represents single bond, —$CH_2CH_2$—, —$CF_2CF_2$—, —CO—O—, —O—CO—, —O—CO—O—, —CH=CH—, —CF=CF—, —CH$_2$O— or —OCH$_2$—;

L$_{A11}$, L$_{A12}$, L$_{A13}$, L$_{A21}$ and L$_{A22}$ each independently represents —H, C$_{1-3}$ alkyl or halogen;

X$_{A1}$ and X$_{A2}$ each independently represents halogen, C$_{1-5}$ halogenated alkyl or halogenated alkoxy, C$_{2-5}$ halogenated alkenyl or halogenated alkenoxy;

n$_{A11}$ represents 0, 1, 2 or 3, when n$_{A11}$=2 or 3, ring

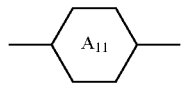

can be same or different, and Z$_{A11}$ can be same or different;

n$_{A12}$ represents 1 or 2, wherein when n$_{A12}$=2, ring

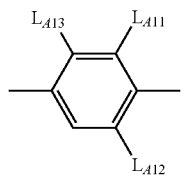

can be same or different; and n$_{A2}$ represents 0, 1, 2 or 3, wherein when n$_{A2}$=2 or 3, ring

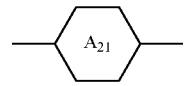

can be same or different, and Z$_{A21}$ can be same or different.

In some embodiments of the present invention, the compound selected from the group consisting of the compounds of general formula A-1 and general formula A-2 provides 0.1-60 wt. % of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, 60 wt. %.

In some embodiments of the present invention, the compound of general formula A-1 is selected from a group consisting of the following compounds:

A-1-1
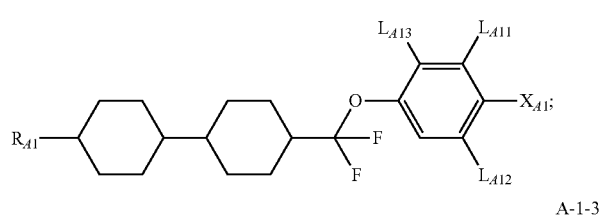

A-1-2
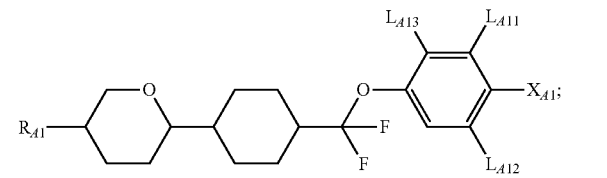

A-1-3
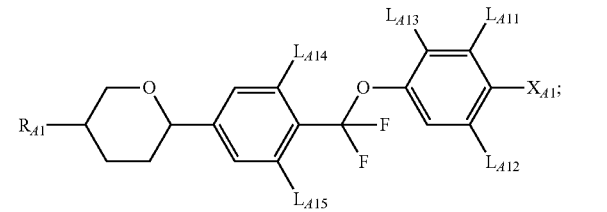

A-1-4
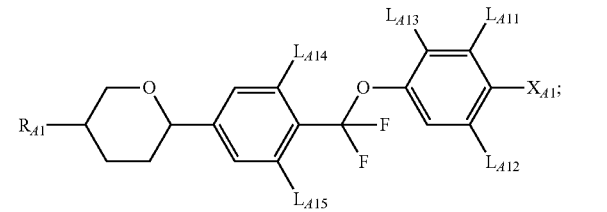

A-1-5
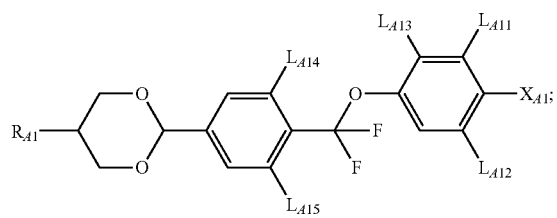

A-1-6
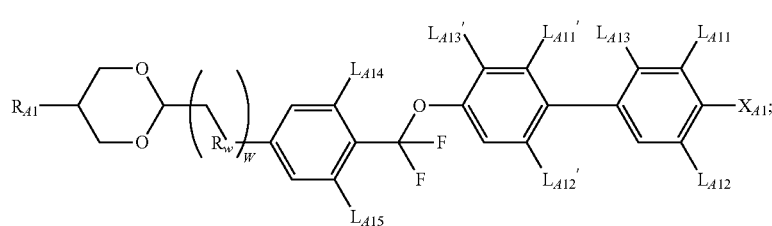

-continued
A-1-7
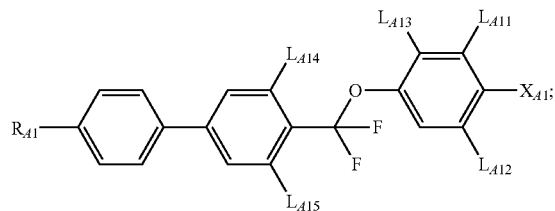
A-1-8
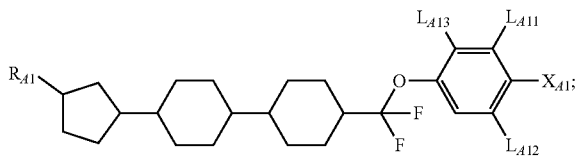
A-1-9
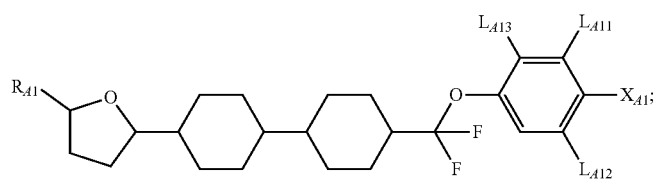
A-1-10
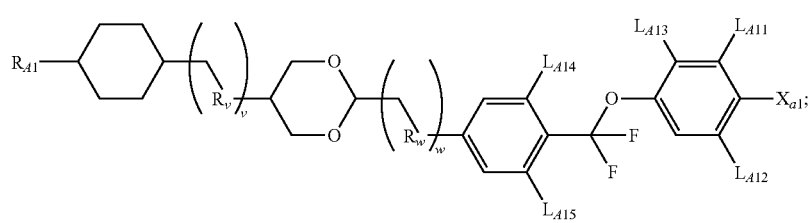
A-1-11
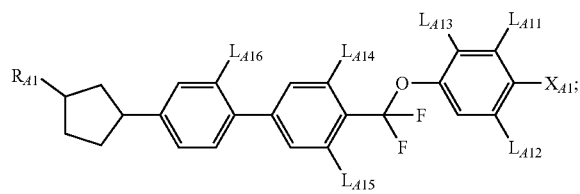
A-1-12
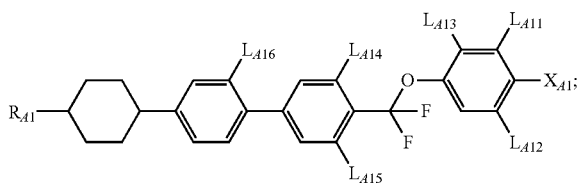
A-1-13
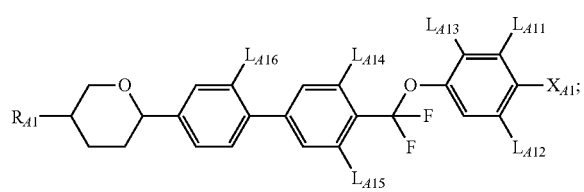
A-1-14
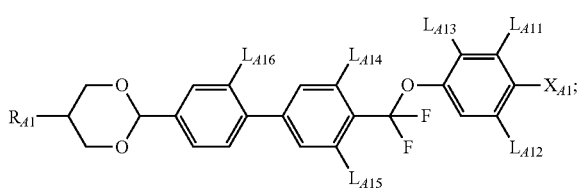
A-1-15
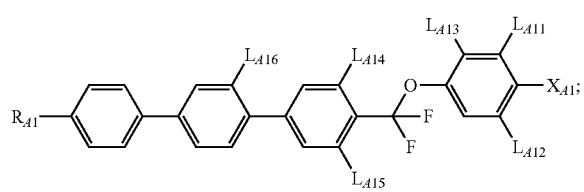
A-1-16
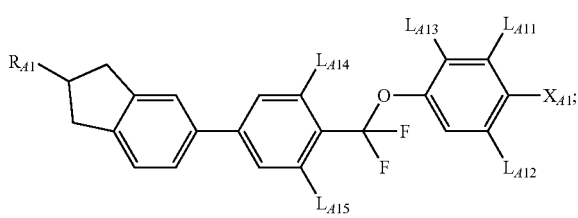
A-1-17
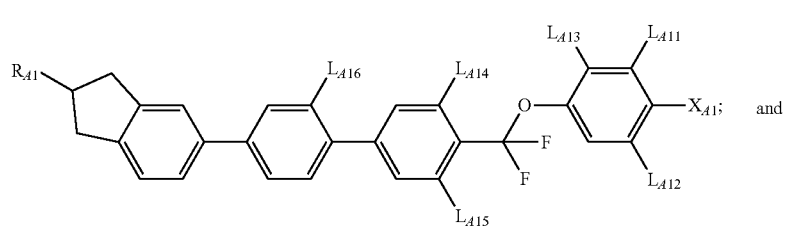
and -continued

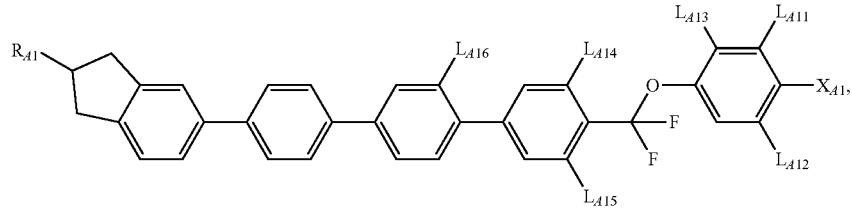
A-1-18 wherein, $R_{A1}$ represents $C_{1-8}$ linear or branched alkyl,

one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H existed in these groups can each be independently substituted by —F or —Cl;

$R_v$ and $R_w$ each independently represents —$CH_2$— or —O—;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$;

$X_{A1}$ represents —F, —$CF_3$ or —$OCF_3$; and v and w each independently represents 0 or 1.

In some embodiments of the present invention, the compound of general formula A-1 provides 0.1-50 wt. % of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %.

It is preferred that the lower limit and the upper limit of the content of the compound of general formula A-1 are slightly lower when it is desired to maintain the liquid crystal composition of the present invention with a lower viscosity and a faster response speed; further, it is preferred that the lower limit and the upper limit of the content of the compound of general formula A-1 are slightly lower when it is desired to maintain the liquid crystal composition of the present invention with a higher clearing point and a good temperature stability; in addition, it is preferred that the lower limit and the upper limit of the content of the compound of general formula A-1 are slightly higher in order to maintain the driving voltage lower and increase the absolute value of the dielectric anisotropy.

In some embodiments of the present invention, the compound of general formula A-2 is selected from a group consisting of the following compounds:

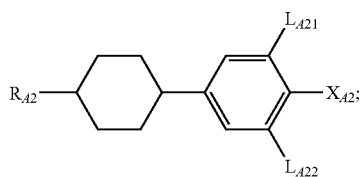
A-2-1

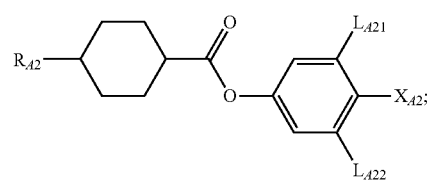
A-2-2

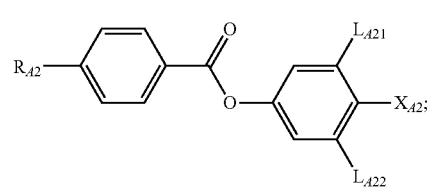
A-2-3

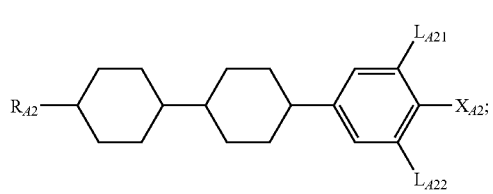
A-2-4

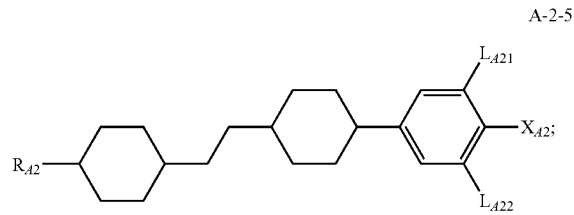
A-2-5

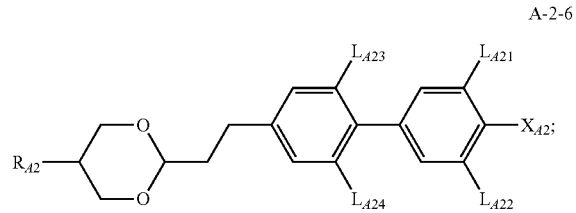
A-2-6

-continued

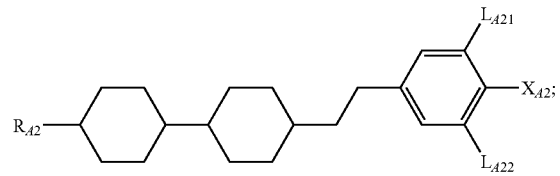
A-2-7

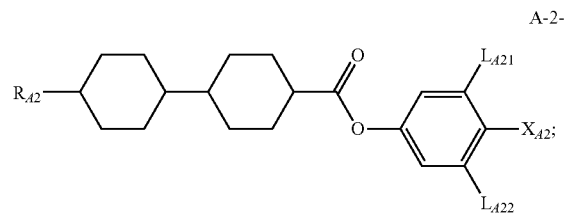
A-2-8

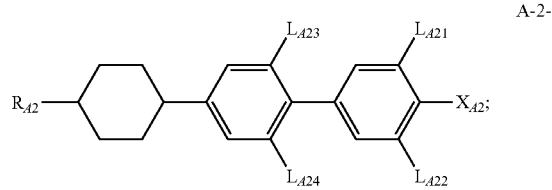
A-2-9

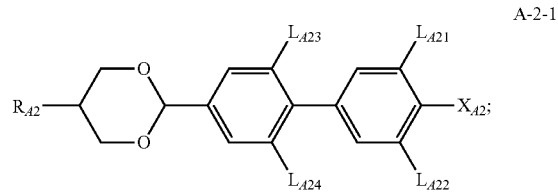
A-2-10

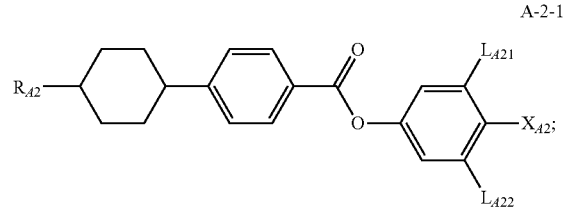
A-2-11

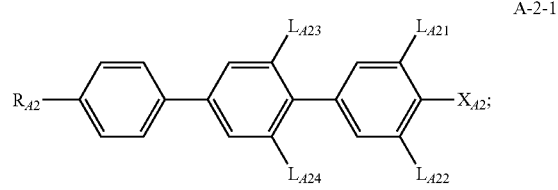
A-2-12

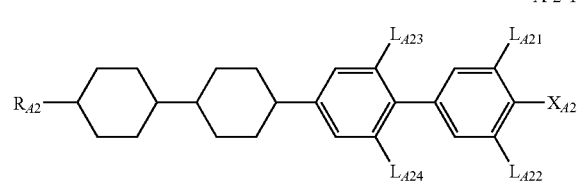
A-2-13

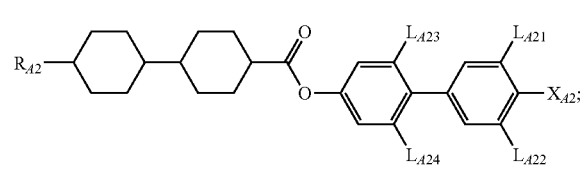
A-2-14

-continued

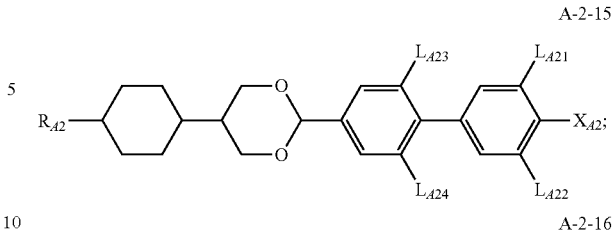
A-2-15

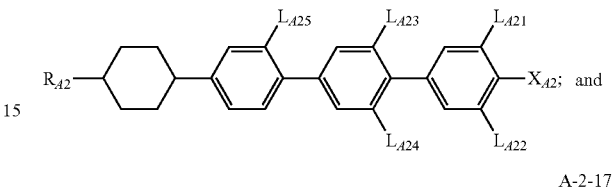
A-2-16

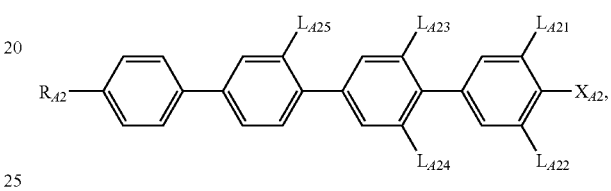
A-2-17 wherein, $R_{A2}$ represents $C_{1-8}$ linear or branched alkyl, wherein one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H in these groups can each be independently substituted by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$=$CF_2$.

In some embodiments of the present invention, the compound of general formula A-2 provides 0.1-50 wt. % of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %.

It is preferred that the lower limit and the upper limit of the content of the compound of general formula A-2 are slightly lower when it is desired to maintain the liquid crystal composition of the present invention with a lower viscosity and a faster response speed; further, it is preferred that the lower limit and the upper limit of the content of the compound of general formula A-2 are slightly lower when it is desired to maintain the liquid crystal composition of the present invention with a higher clearing point and a good temperature stability; in addition, it is preferred that the lower limit and the upper limit of the content of the compound of general formula A-2 are slightly higher in order to maintain the driving voltage lower and increase the absolute value of the dielectric anisotropy.

In some embodiments of the present invention, the liquid crystal composition further comprises at least one compound of general formula B

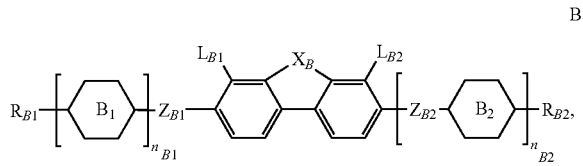

B wherein, $R_{B1}$ and $R_{B2}$ each independently represents halogen, —$CF_3$, —$OCF_3$, $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

one or more nonadjacent —$CH_2$— in the $C_{1-12}$ linear or branched alkyl,

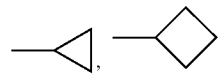

can each be independently replaced by —C≡C—, —O—, —CO—, —CO—O— or —O—CO—;

ring

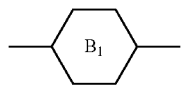

and ring

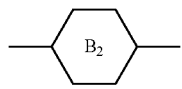

each independently represents

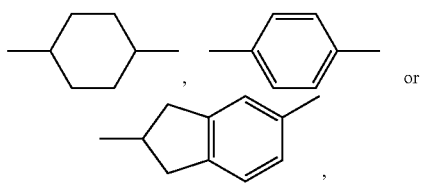

wherein one or more —$CH_2$— in

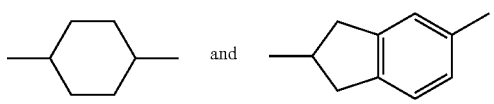

can be replaced by —O—, one or more single bond in the rings can be replaced by double bond, wherein one or more —H on

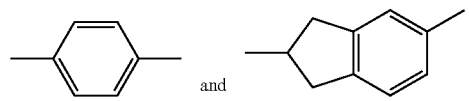

can each be independently substituted by —CN, —F or —Cl, and one or more —CH= in the rings can be replaced by —N=;

$X_B$ represents —O—, —S— or —CO—;

$L_{B1}$ and $L_{B2}$ each independently represents —H, —F, —Cl, —$CF_3$ or —$OCF_3$;

$Z_{B1}$ and $Z_{B2}$ each independently represents single bond, —O—, —CO—O—, —O—CO—, —$CH_2$O—, —$OCH_2$—, —CH=CH—, —C≡C—, —$CH_2CH_2$—, —$CF_2CF_2$—, —$(CH_2)_4$—, —$CF_2$O— or —$OCF_2$—; and $n_{B1}$ and $n_{B2}$ each independently represents 0, 1 or 2, wherein, when $n_{B1}$ represents 2, ring

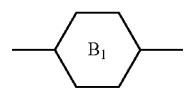

can be same or different, when $n_{B2}$ represents 2, ring

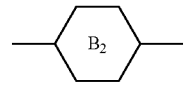

can be same or different, and $Z_{B2}$ can be same or different.

In some embodiments of the present invention, the compound of general formula B is selected from a group consisting of the following compounds:

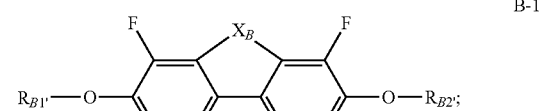
B-1

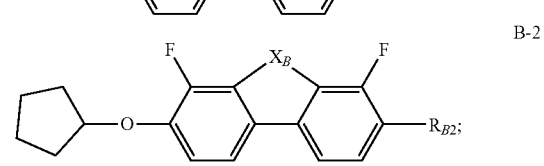
B-2

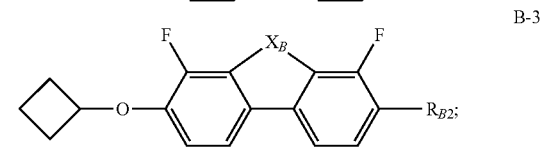
B-3

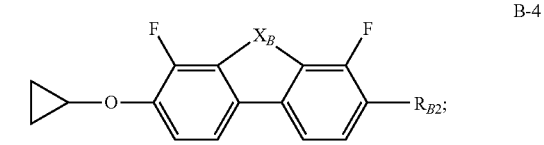
B-4

-continued

B-5

[chemical structure with tetrahydrofuranyl-O- group, fluorines, $X_B$, and $R_{B2}$]

B-6

[chemical structure with cyclopentylmethyl-O- group, fluorines, $X_B$, and $R_{B2}$]

B-7

[chemical structure with cyclopropylmethyl-O- group, fluorines, $X_B$, and $R_{B2}$]

B-8

[chemical structure with $R_{B1'}$—O—, fluorines, $X_B$, and —OCF$_3$]

B-9

[chemical structure with $R_{B1'}$—O—, fluorines, $X_B$, and —CF$_3$]

B-10

[chemical structure with cyclohexenyl, $R_{B1}$, fluorines, $X_B$, and $R_{B2}$]; and

B-11

[chemical structure with cyclohexyl-CH$_2$—O—, $R_{B1}$, fluorines, $X_B$, and $R_{B2}$]

B-12

[chemical structure with phenyl, $R_{B1}$, fluorines, $X_B$, and $R_{B2}$], wherein, $R_{B1'}$ and $R_{B2'}$ each independently represents $C_{1-11}$ linear or branched alkyl.

In some embodiments of the present invention, the compound of general formula B provides 0.1-30 wt. % of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %.

In some embodiments of the present invention, the liquid crystal composition further comprises at least one polymerizable compound of general formula RM:

RM $$P_1-Sp_1-\left[\underset{}{\underbrace{A_1}}-Z_1\right]_a-\underset{}{\underbrace{A_2}}-\left[Z_2-\underset{}{\underbrace{A_3}}\right]_b-R_1,$$

wherein, $R_1$ represents —H, halogen, —CN, -Sp$_2$-P$_2$, $C_{1-12}$ (for example, $C_1$, $C_2$, $C_3$, $C_4$, $C_5$, $C_6$, $C_7$, $C_8$, $C_9$, $C_{10}$, $C_{11}$, $C_{12}$) linear or branched alkyl,

[cyclopropyl], [cyclobutyl] or [cyclopentyl], wherein one or more nonadjacent —CH$_2$— in the $C_{1-12}$ linear or branched alkyl,

[cyclopropyl], [cyclobutyl] or [cyclopentyl], can each be independently replaced by —CH═CH—, —C≡C—, —O—, —CO—, —CO—O— or —O—CO—, and one or more —H can each be independently substituted by —F or —Cl;

ring

[ring $A_1$]

and ring

[ring $A_3$]

each independently represents

[cyclohexyl], [phenyl], or

[indanyl], wherein one or more —CH$_2$— in

[cyclohexyl] and [indanyl]

and can be replaced by —O—, and one or more single bond in the rings can be replaced by double bond, wherein one or more —H on

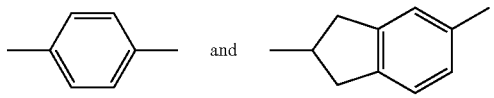

can each be independently substituted by —F, —Cl, —CN, -Sp$_3$-P$_3$, C$_{1-12}$ halogenated or unhalogenated linear alkyl, C$_{1-11}$ halogenated or unhalogenated linear alkoxy,

and one or more —CH= in the rings can be replaced by —N=;

ring

represents

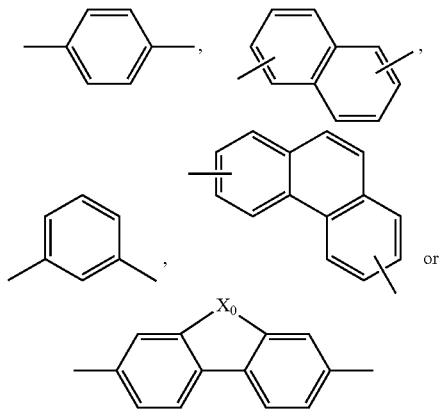

wherein one or more —H on

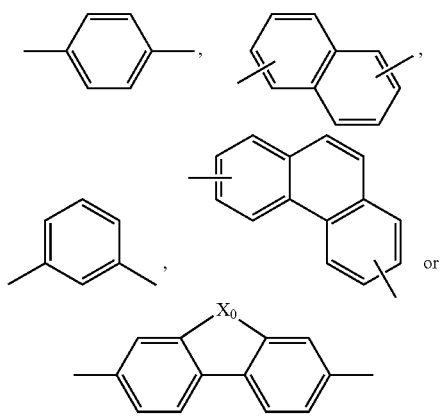

can each be independently substituted by —F, —Cl, —CN, -Sp$_3$-P$_3$, C$_{1-12}$ halogenated or unhalogenated linear alkyl, C$_{1-11}$ halogenated or unhalogenated linear alkoxy,

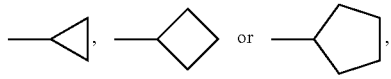

and one or more —CH= in the rings can be replaced by —N=;

P$_1$, P$_2$ and P$_3$ each independently represents a polymerizable group;

Sp$_1$, Sp$_2$ and Sp$_3$ each independently represents a spacer group or single bond;

Z$_1$ and Z$_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_d$—, —CF$_2$CH$_2$—, —CH$_2$CF$_2$—, —(CF$_2$)$_d$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, —CHR$^1$—, —CR$^1$R$^2$— or single bond, wherein R$^1$ and R$^2$ each independently represents C$_{1-12}$ linear or branched alkyl, and d represents an integer of 1-4;

X$_0$ represents —O—, —S—, —CO— —CF$_2$—, —NH— or —NF—;

a represents 0, 1 or 2, b represents 0 or 1, wherein when a represents 2, ring

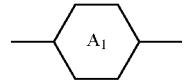

can be same or different, and Z$_1$ can be same or different.

In some embodiments of the present invention, the compound of general formula RM is selected from a group consisting of the following compounds:

RM-1

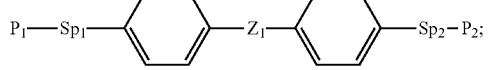

RM-2

RM-3

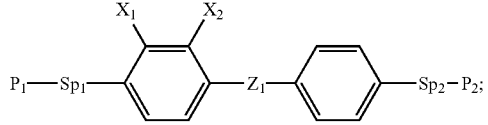

RM-4
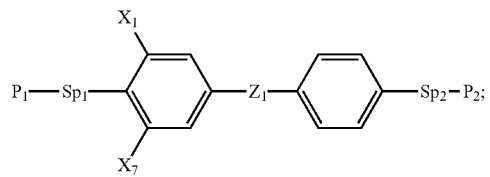
RM-5
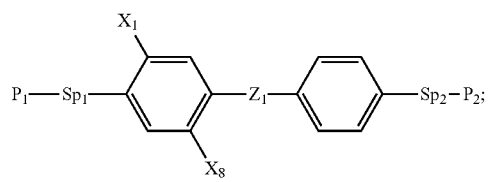
RM-6
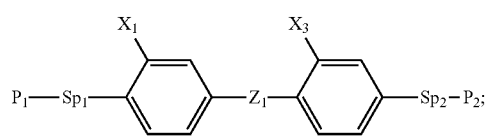
RM-7
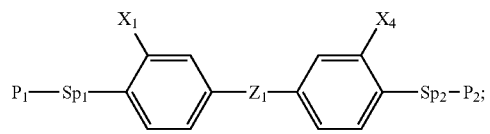
RM-8
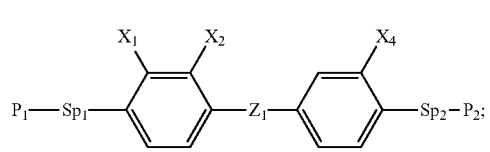
RM-9
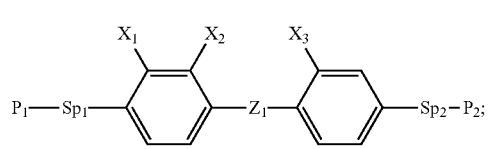
RM-10
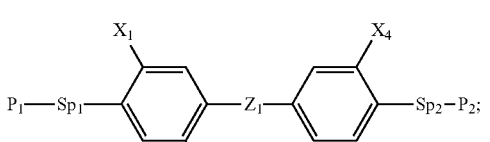
RM-11
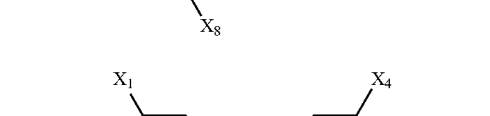
RM-12
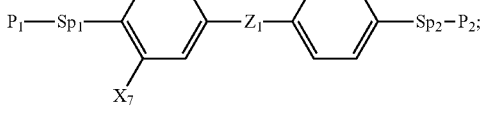
RM-13
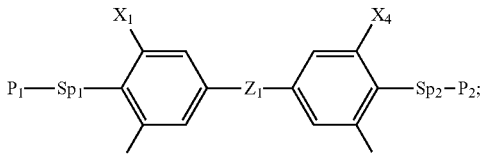
RM-14
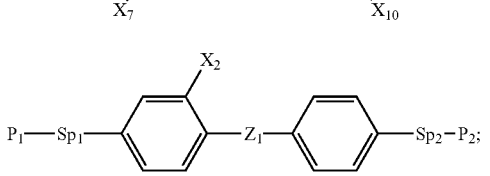
RM-15
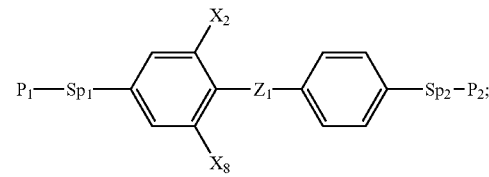
RM-16
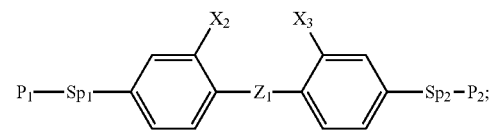
RM-17
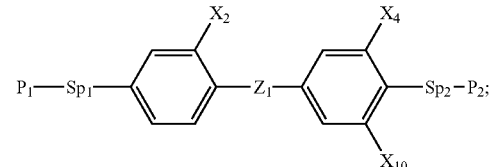
RM-18
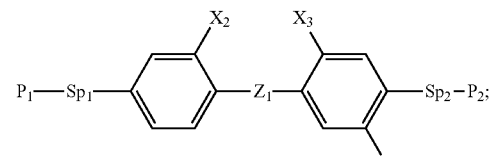
RM-19
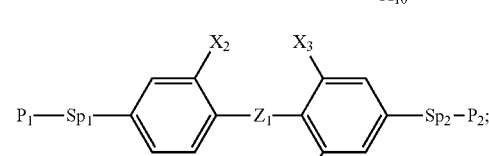
RM-20
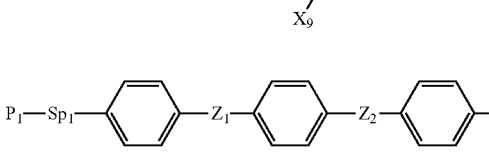
RM-21
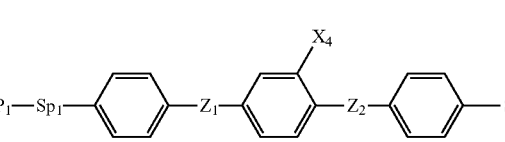
RM-22
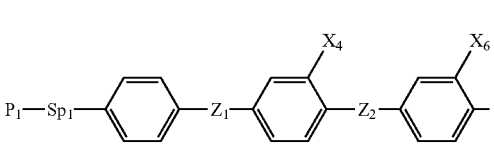
RM-23
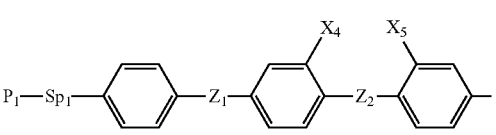
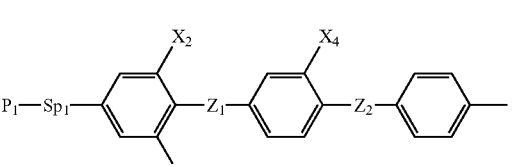

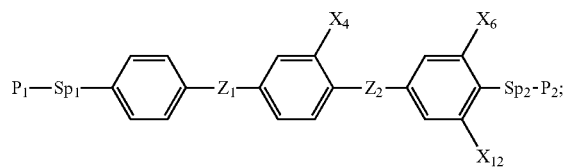

RM-24

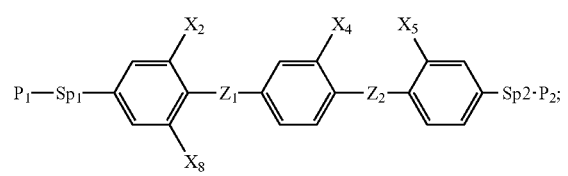

RM-25

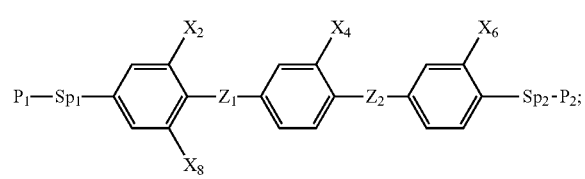

RM-26

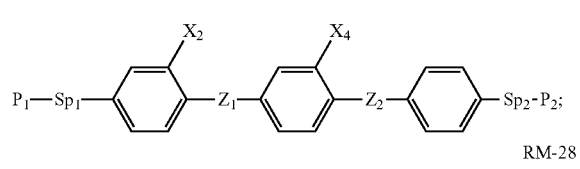

RM-27

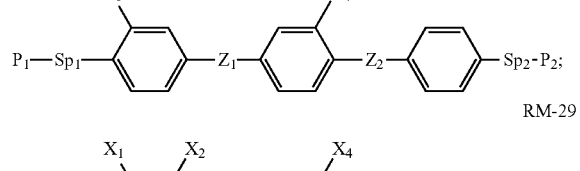

RM-28

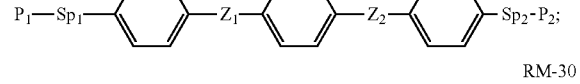

RM-29

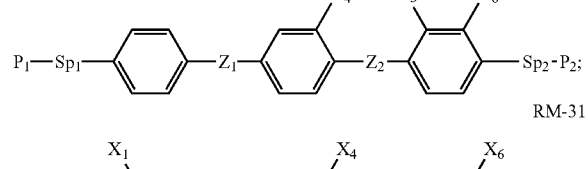

RM-30

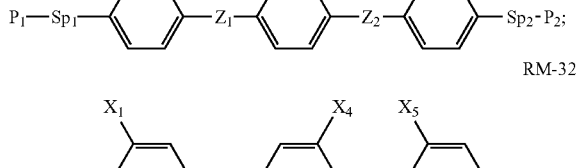

RM-31

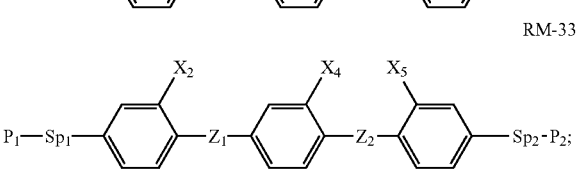

RM-32

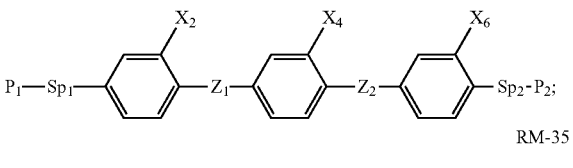

RM-33

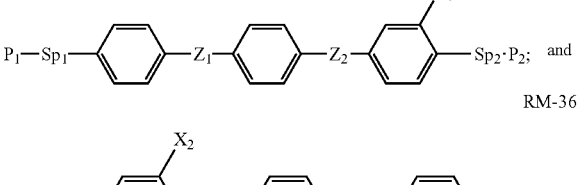

RM-34

RM-35

RM-36 wherein,
$X_1$-$X_{10}$ and $X_{12}$ each independently represents —F, —Cl, -$Sp_3$-$P_3$, $C_{1-5}$ linear alkyl or alkoxy,

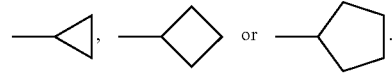

The polymerizable groups involved in the present invention are groups suitable for polymerization reactions (for example, radical or ionic bond polymerization, addition polymerization or condensation polymerization), or groups suitable for addition or condensation on the polymer backbone. For chain polymerization, a polymerizable group containing —C═C— or —C≡C— is particularly preferred, and for ring-opening polymerization, for example, an oxetane or epoxy group is particularly preferred.

In some embodiments of the present invention, the polymerizable groups $P_1$, $P_2$ and $P_3$ each independently represents

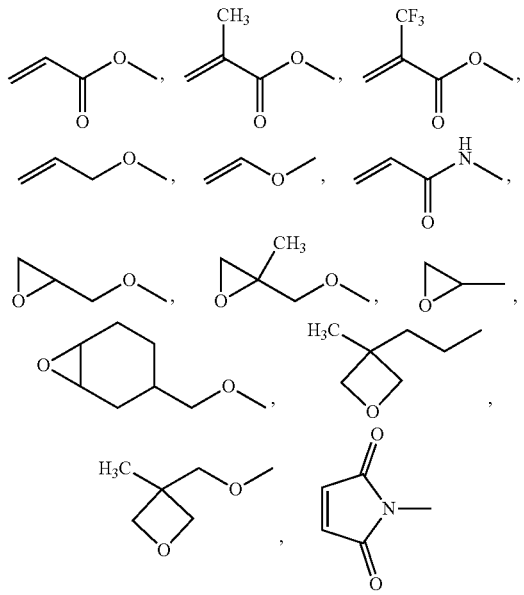

or —SH; preferably, the polymerizable groups $P_1$, $P_2$ and $P_3$ each independently represents

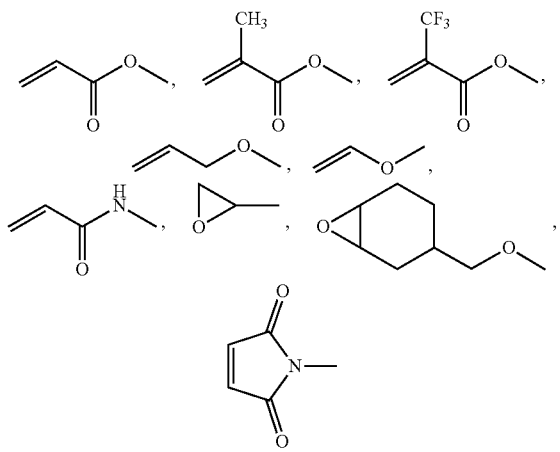

or —SH; further preferably, the polymerizable groups $P_1$, $P_2$ and $P_3$ each independently represents

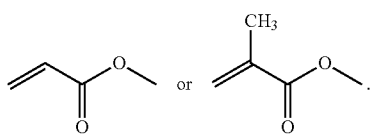

The term "spacer group" as used herein, is known to the person skilled in the art and is described in the references (for example, Pure Appl. Chem. 2001, 73(5), 888 and C. Tschierske, G. Pelzl, S. Diele, Angew. Chem. 2004, 116, 6340-6368). As used herein, the term "spacer group" represents a flexible group which connects the mesogenic group and the polymerizable group in a polymerizable compound. For example, —$(CH_2)p_1$-, —$(CH_2CH_2O)q_1$-$CH_2CH_2$—, —$(CH_2CH_2S)q_1$-$CH_2CH_2$—, —$(CH_2CH_2NH)q_1$-$CH_2CH_2$—, —$CR^OR^{OO}$—$(CH_2)p_1$- or —$(SiR^OR^{OO}$—$O)p_1$- are representative spacer groups, wherein $p_1$ represents an integer of 1-12, $q_1$ represents an integer of 1-3, $R^O$ and $R^{OO}$ each independently represents —H, $C_{1-12}$ linear, branched alkyl or $C_{3-12}$ cyclic alkyl. The spacer group is preferably —$(CH_2)p_1$-, —$(CH_2)p_1$-O—, —$(CH_2)p_1$-O—CO—, —$(CH_2)p_1$-CO—O—, —$(CH_2)p_1$-O—CO—O— or —$CR^OR^{OO}$—$(CH_2)p_1$-.

In some embodiments of the present invention, the polymerizable compound of general formula RM provides 0.001-5 wt. % of the total weight of the liquid crystal composition, for example, 0.001 wt. %, 0.002 wt. %, 0.004 wt. %, 0.005 wt. %, 0.006 wt. %, 0.008 wt. %, 0.01 wt. %, 0.02 wt. %, 0.04 wt. %, 0.06 wt. %, 0.08 wt. %, 0.1 wt. %, 0.2 wt. %, 0.25 wt. %, 0.26 wt. %, 0.27 wt. %, 0.28 wt. %, 0.29 wt. %, 0.3 wt. %, 0.32 wt. %, 0.33 wt. %, 0.34 wt. %, 0.35 wt. %, 0.4 wt. %, 0.5 wt. %, 0.6 wt. %, 0.8 wt. %, 1 wt. %, 1.2 wt. %, 1.6 wt. %, 1.8 wt. %, 2 wt. %, 2.5 wt. %, 3 wt. %, 3.5 wt. %, 4 wt. %, 4.5 wt. %, 5 wt. %.

In some embodiments of the present invention, the liquid crystal composition comprises at least one additive.

In addition to the above compounds, the liquid crystal composition of the present invention may also contain normal nematic liquid crystal, smectic liquid crystal, cholesteric liquid crystal, dopants, antioxidant, ultraviolet absorber, infrared absorber, polymerizable monomer or light stabilizer and so forth.

Dopants which can be preferably added to the liquid crystal composition according to the present invention are shown below:

C15
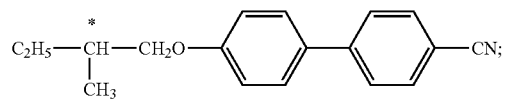

CB15
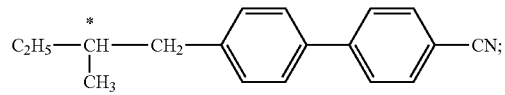

CM21
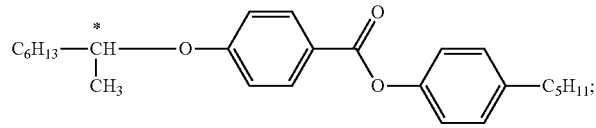

R/S-811
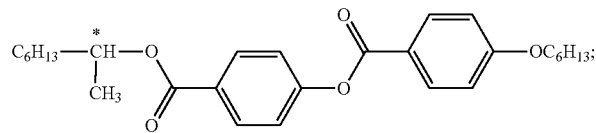

CM44
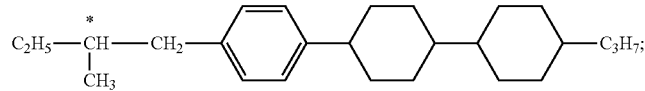

-continued
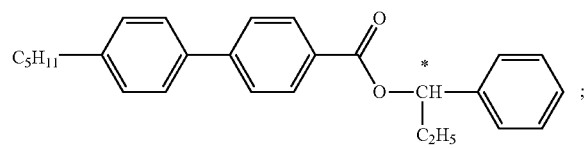 CM 45
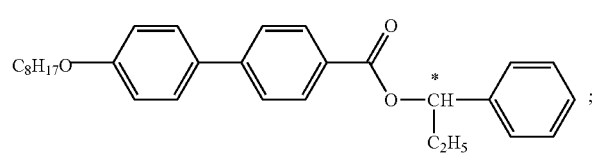 CM 47
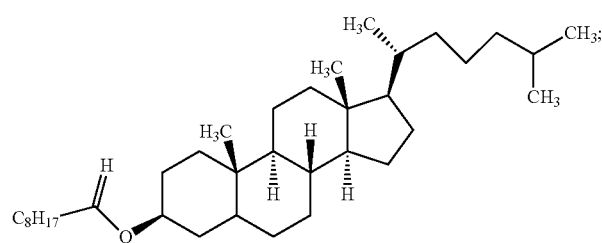 CN
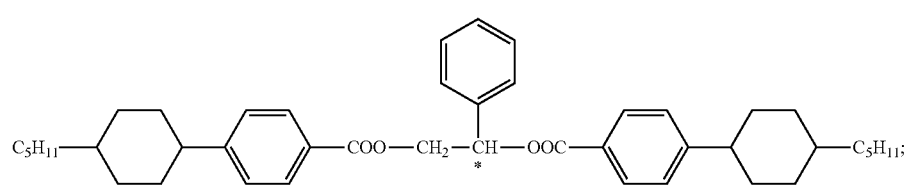 R/S-1011
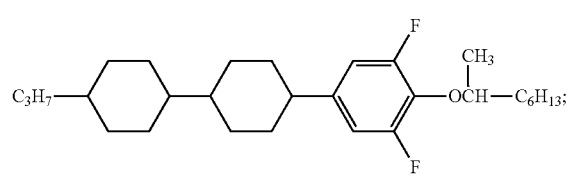 R/S-2011
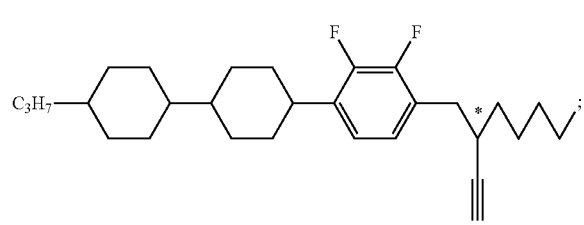 R/S-3011
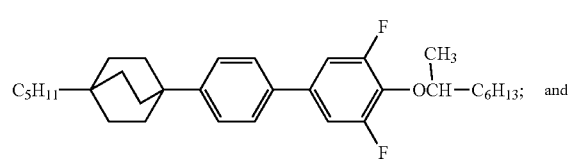 R/S-4011 and
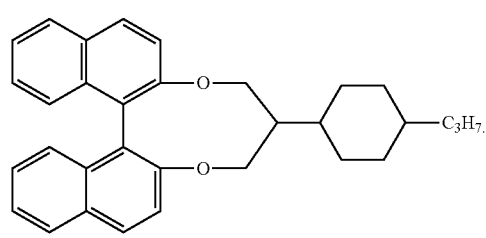 R/S-5011

In some embodiments of the present invention, the dopant provides 0-5% by weight of the total weight of the liquid crystal composition; preferably, 0.01-1% by weight of the total weight of the liquid crystal composition.

Further, additives used in the liquid crystal composition of the present invention, such as antioxidant, light stabilizer, ultraviolet absorbers and the forth, are preferably selected from the following substances:

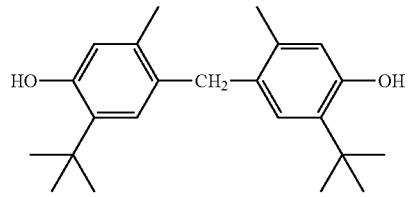

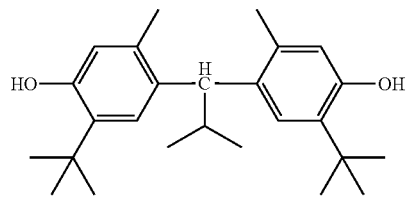

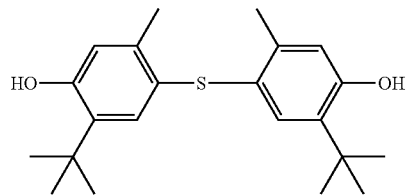

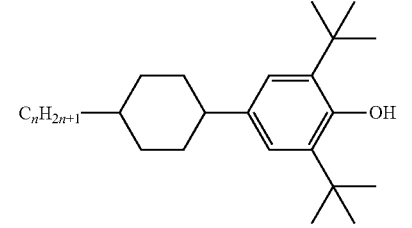

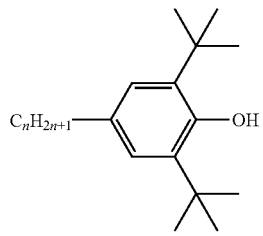

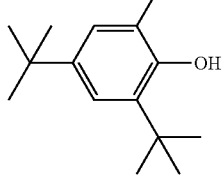

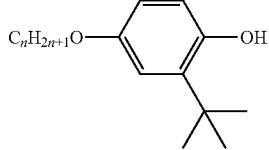

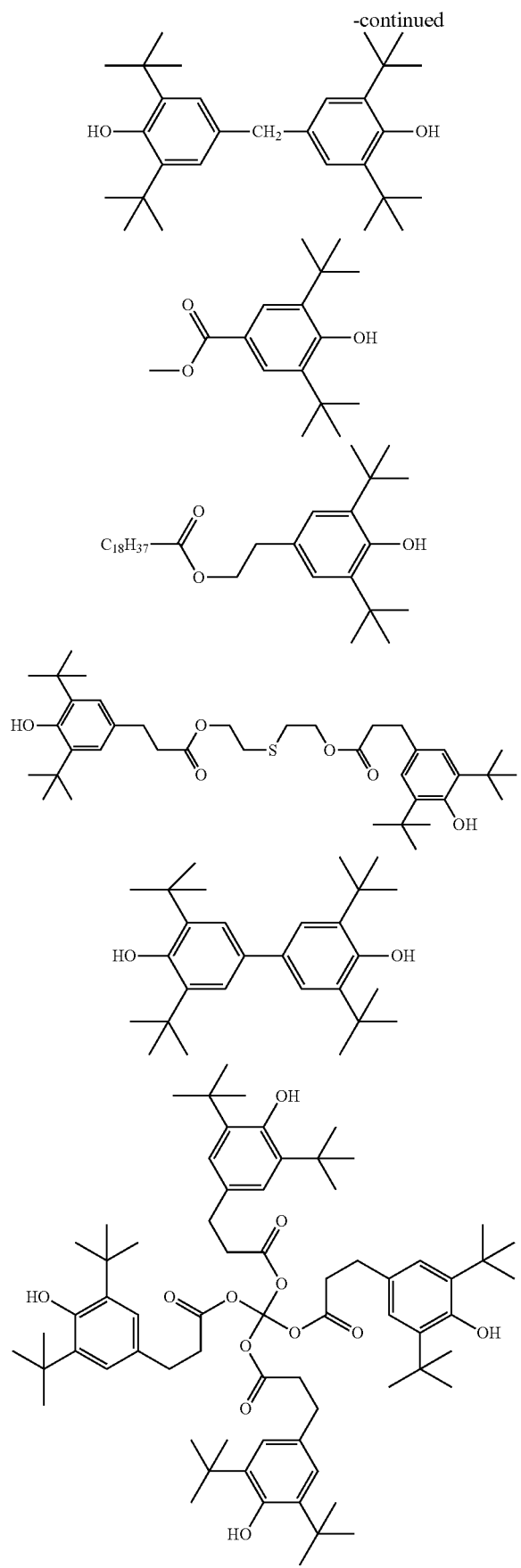

-continued
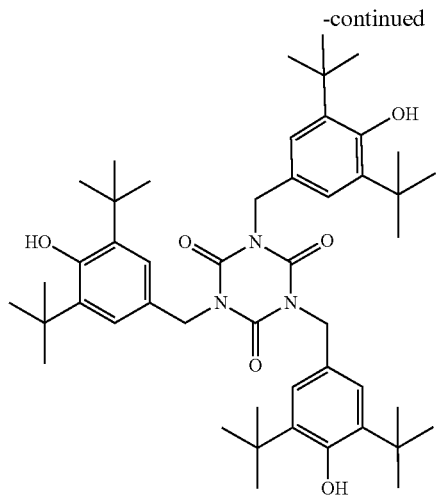
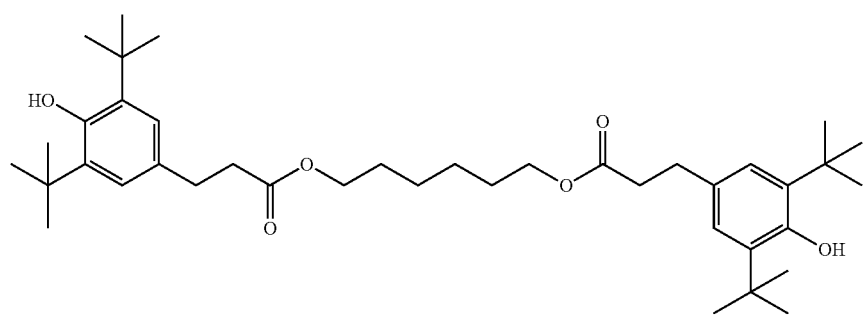
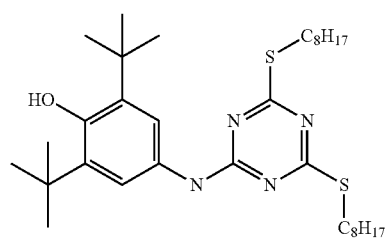
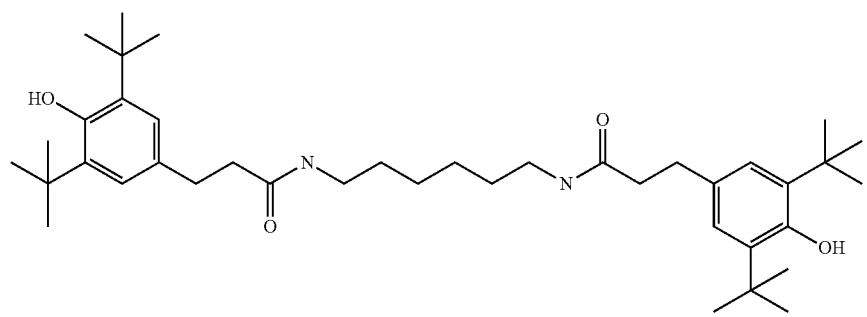
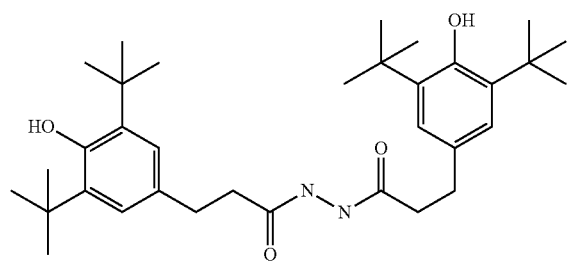

-continued
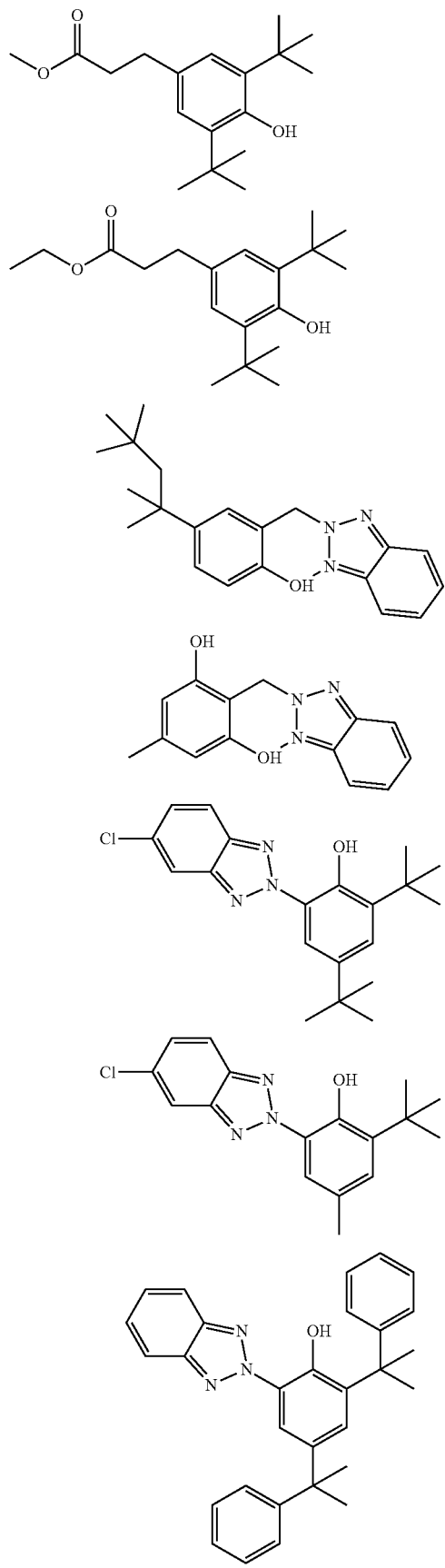

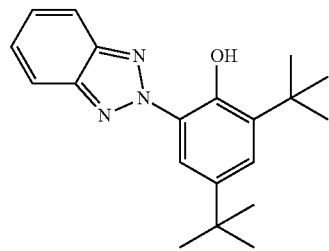
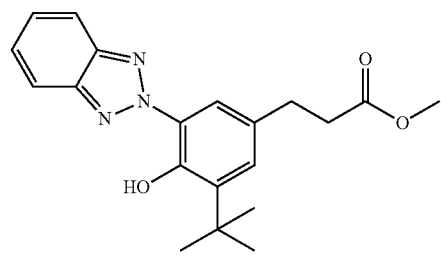
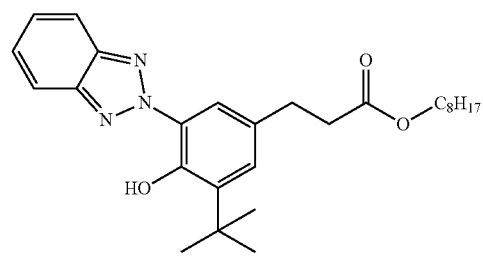
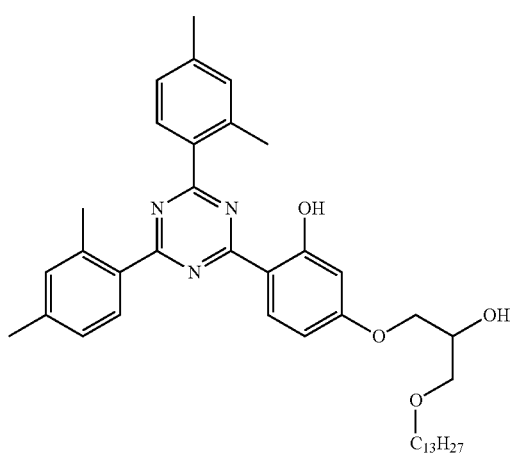

-continued
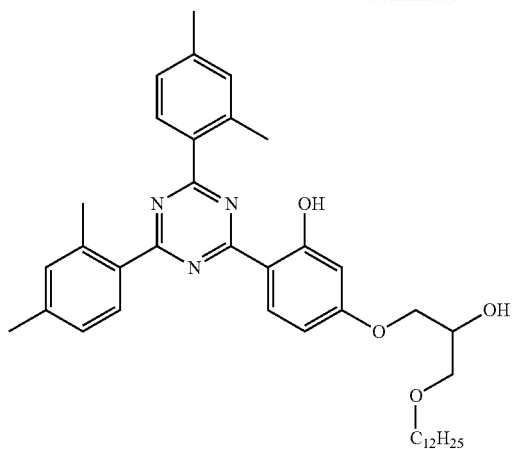
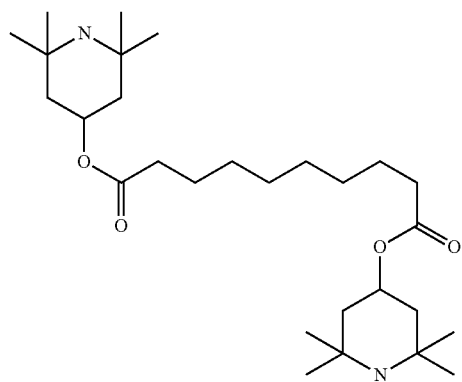
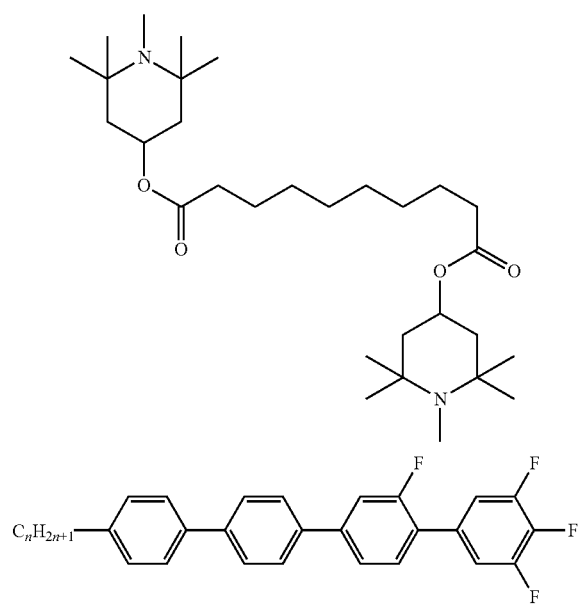
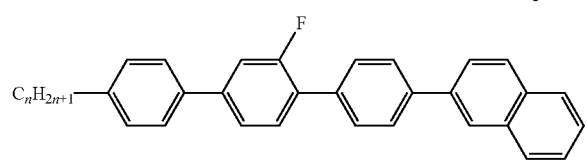

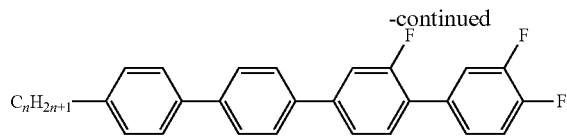

wherein, n represents a positive integer of 1-12.

Preferably, the antioxidant is selected from the compounds as shown below:

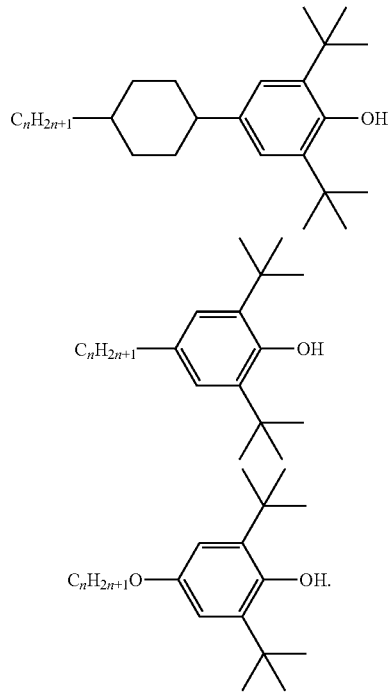

In some embodiments of the present invention, the additive provides 0-5% by weight of the total weight of the liquid crystal composition; preferably, the additive provides 0.01-1% by weight of the total weight of the liquid crystal composition.

On another hand, the present invention further provides a liquid crystal display device comprising above liquid crystal composition.

In some embodiments of the present invention, above liquid crystal composition is particularly suitable in VA, IPS, FFS or ECB type display elements.

Beneficial effects: Compared with the prior art, the liquid crystal composition of the present invention has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compounds in the following Examples are represented by the codes listed in Table 2:

TABLE 2

Codes of the group structures of the compounds

| Unit structure of group | Code | Name of group |
|---|---|---|
|  | C | 1,4-cyclohexylidene |
|  | P | 1,4-phenylene |
|  | L | 1,4-cyclohexene |
|  | C(5,V) | cyclopentenyl |

TABLE 2-continued

Codes of the group structures of the compounds

| Unit structure of group | Code | Name of group |
|---|---|---|
| (2-fluoro-1,4-phenylene structure) | G | 2-fluoro-1,4-phenylene |
| (3-fluoro-1,4-phenylene structure) | G' | 3-fluoro-1,4-phenylene |
| (2,3-difluoro-1,4-phenylene structure) | W | 2,3-difluoro-1,4-phenylene |
| (4,6-difluoro-dibenzo[b,d]furan structure) | B(O) | 4,6-difluoro-dibenzo[b,d]furan-3,7-diyl |
| (4,6-difluoro-dibenzo[b,d]thiophene structure) | B(S) | 4,6-difluoro-dibenzo[b,d]thiophene-3,7-diyl |
| (difluoroalkenyl structure) | V(2F) | difluoroalkenyl |
| —F | F | fluorine substituent |
| —O— | O | oxygen bridge bond |
| —CH=CH— or —CH=CH$_2$ | V | ethenylene or ethenyl |
| —CH$_2$O— | 1O | methyleneoxy |
| —CH$_2$CH$_2$— | 2 | ethyl bridge bond |
| —C$_n$H$_{2n+1}$— or —C$_n$H$_{2n}$— | n (n represents an integer of 1-12) | alkyl or alkylene |

Take the compound with following structural formula as an example:

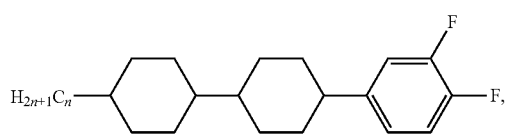

represented by the codes listed in Table 2, this structural formula can be expressed as nCCGF, in which, n in the code represents the number of the carbon atoms of the alkyl on the left, for example, n is "3", meaning that the alkyl is —C$_3$H$_7$; C in the code represents 1,4-cyclohexylidene, G represents 2-fluoro-1,4-phenylene, and F represents fluoro.

The abbreviated codes of the test items in the following Examples are as follows:

Cp clearing point (nematic-isotropy phases transition temperature, ° C.)

Δn optical anisotropy (589 nm, 20° C.)

Δε dielectric anisotropy (1 KHz, 20° C.)

K$_{11}$ splay elastic constant

K$_{33}$ bend elastic constant

τ$_{off}$ the time required to reduce the transmittance from 90% to 10% when removing the electric field (ms, 20° C.)

VHR (initial) initial voltage holding ratio (%)

VHR (UV) voltage holding ratio after UV-irradiation (%)

voltage holding ratio after maintained at a high temperature of 150° C. for 1 hour (%)

t$_{-20°\ C.}$ low-temperature storage time (day, at −20° C.)

γ$_1$ rotational viscosity (mPa·s, at 20° C.)

wherein,

Cp: tested by melting point apparatus.

Δn: tested using an Abbe Refractometer under a sodium lamp (589 nm) light source at 20° C.

Δε: Δε=ε$_∥$−ε$_⊥$, in which, ε$_∥$ is the dielectric constant parallel to the molecular axis, ε$_⊥$ is the dielectric constant perpendicular to the molecular axis, test conditions: 20° C., 1 KHz, VA-type test cell with a cell gap of 6 μm.

VHR (initial): initial voltage holding ratio, tested using a TOY06254 liquid crystal physical property evaluation system; the test temperature is 60° C., the test voltage is 5 V, the test frequency is 6 Hz, TN-type test cell with a cell gap of 9 μm.

VHR (UV): tested using a TOY06254 liquid crystal physical property evaluation system; tested after using UV light with a wavelength of 365 nm and energy of 6000 μmJ/cm$^2$ to irradiate the liquid crystal, the test temperature is 60° C., the test voltage is 5 V, the test frequency is 6 Hz, TN-type test cell with a cell gap of 9 μm.

VHR (Ra): tested using a TOY06254 liquid crystal physical property evaluation system; the liquid crystal composition is tested after maintaining at a high temperature of 150° C. for 1 h; the test temperature is 60° C., the test voltage is 5 V, the test frequency is 6 Hz, TN-type test cell with a cell gap of 9 μm.

$t_{-20°\ C.}$ the time recorded when precipitation of crystals was observed after the nematic liquid crystal medium being placed in a glass bottle and stored at −20° C.

$\gamma_1$: tested using a LCM-2 type liquid crystal physical property evaluation system; test conditions: 20° C., 160-260 V, the cell gap is 20 μm.

$K_{11}$ and $K_{33}$: calculated by C—V curves of liquid crystal tested by LCR meter and VA-type test cell; test conditions: the cell gap is 6 μm, V=0.1~20 V, 20° C.

$\tau_{off}$: tested using a DMS 505 liquid crystal display screen optical measurement system, test conditions: negative IPS-type test cell with a cell gap of 3.5 μm, 20° C.

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples. The preparation of the liquid crystal compositions is proceeded according to the conventional methods in the art, such as heating, ultrasonic processing, suspending processing and so forth.

Wherein, 5PGP(NA) represents ultraviolet absorber

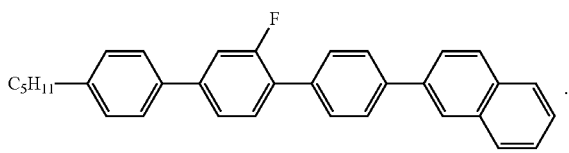

COMPARATIVE EXAMPLE 1

The liquid crystal composition of Comparative Example 1 is prepared according to each compound and weight percentage listed in Table 3 and is tested by filling the same between two substrates of a liquid crystal display device.

TABLE 3

Formulation and test performances of liquid crystal composition

| Code of component | Weight percent | Code of structure | Test results for the performance parameters | |
|---|---|---|---|---|
| 2CPWO2 | 4.5 | N-21 | Cp | 75.34 |
| 3CPWO2 | 9 | N-21 | Δn | 0.1143 |
| 3CLWO2 | 7 | N-12 | Δε | −2.89 |
| 2OPWO2 | 3.5 | N-19 | $K_{11}$ | 14.1 |
| 3PWO2 | 9 | N-19 | $K_{33}$ | 15.2 |
| 1PWO2 | 11 | N-19 | $\gamma_1$ | 69.7 |
| 3CPP2 | 4.5 | M-13 | VHR(initial) | 95.36 |
| 3CCP1 | 8 | M-11 | VHR (UV) | 85.84 |
| 3CCV | 29 | M-1 | VHR (Ra) | 95.94 |
| 3CCV1 | 8.5 | M-1 | $t_{-20°\ C.}$ | 13 |
| 4OB(S)O2 | 4 | B-1 | $\tau_{off}$ | 16.9 |
| 5OB(S)O2 | 2 | B-1 | | |
| Total | 100 | | | |

EXAMPLE 1

The liquid crystal composition of Example 1 is prepared according to each compound and weight percentage listed in Table 4 and is tested by filling the same between two substrates of a liquid crystal display device.

TABLE 4

Formulation and test performances of liquid crystal composition

| Code of component | Weight percent | Code of structure | Test results for the performance parameters | |
|---|---|---|---|---|
| 2CPWO2 | 4.5 | N-21 | Cp | 74.34 |
| 3CPWO2 | 9 | N-21 | Δn | 0.1141 |
| 3CLWO2 | 7 | N-12 | Δε | −2.91 |
| 2OPWO2 | 3.5 | N-19 | $K_{11}$ | 14.4 |
| 3PWO2 | 9 | N-19 | $K_{33}$ | 15.5 |
| 1PWO2 | 11 | N-19 | $\gamma_1$ | 69.3 |
| 3CPP2 | 4.5 | M-13 | VHR (initial) | 95.53 |
| 3CCP1 | 8 | M-11 | VHR (UV) | 85.11 |
| 3CCV | 29 | M-1 | VHR (Ra) | 96.14 |
| 3CCV1 | 8.5 | M-1 | $t_{-20°\ C.}$ | 14 |
| 4OB(S)OV(2F) | 4 | F-1 | $\tau_{off}$ | 16.2 |
| 2OB(S)OV(2F) | 2 | F-1 | | |
| Total | 100 | | | |

EXAMPLE 2

The liquid crystal composition of Example 2 is prepared according to each compound and weight percentage listed in Table 5 and is tested by filling the same between two substrates of a liquid crystal display device.

TABLE 5

Formulation and test performances of liquid crystal composition

| Code of component | Weight percent | Code of structure | Test results for the performance parameters | |
|---|---|---|---|---|
| 2CPWO2 | 4.5 | N-21 | Cp | 74.34 |
| 3CPWO2 | 9 | N-21 | Δn | 0.1141 |
| 3CLWO2 | 7 | N-12 | Δε | −2.91 |
| 2OPWO2 | 3.5 | N-19 | $K_{11}$ | 14.37 |
| 3PWO2 | 9 | N-19 | $K_{33}$ | 15.46 |
| 1PWO2 | 11 | N-19 | $\gamma_1$ | 69.24 |
| 3CPP2 | 4.5 | M-13 | VHR (initial) | 95.51 |
| 3CCP1 | 8 | M-11 | VHR (UV) | 85.17 |
| 3CCV | 29 | M-1 | VHR (Ra) | 96.13 |

TABLE 5-continued

Formulation and test performances of liquid crystal composition

| Code of component | Weight percent | Code of structure | Test results for the performance parameters | |
|---|---|---|---|---|
| 3CCV1 | 8.5 | M-1 | $t_{-20°\ C.}$ | 15 |
| 4OB(S)C(5, V) | 2 | F-20 | $\tau_{off}$ | 16.3 |
| 4OB(S)OV(2F) | 4 | F-1 | | |
| Total | 100 | | | |

It can be seen from the comparison between Examples 1-2 and Comparative Example 1 that the liquid crystal composition of the present invention has a larger K value (value of $K_{11}$ and value of $K_{33}$), a smaller rotational viscosity, a higher VHR value (VHR (initial), VHR (UV), VHR (Ra)), a longer low temperature storage time and a shorter response time while maintaining an appropriate clearing point, an appropriate optical anisotropy, and an appropriate absolute value of dielectric anisotropy.

EXAMPLE 3

The liquid crystal composition of Example 3 is prepared according to each compound and weight percentage listed in Table 6 and is tested by filling the same between two substrates of a liquid crystal display device.

TABLE 6

Formulation and test performances of liquid crystal composition

| Code of component | Weight percent | Code of structure | Test results for the performance parameters | |
|---|---|---|---|---|
| 2CPWO2 | 3.5 | N-21 | Cp | 77.6 |
| 3CPWO2 | 6.3 | N-21 | Δn | 0.1144 |
| 3CLWO2 | 7 | N-12 | Δε | -2.95 |
| 2OPWO2 | 5.5 | N-19 | $K_{11}$ | 14.98 |
| 3PWO2 | 6 | N-19 | $K_{33}$ | 15.99 |
| 1PWO2 | 11 | N-19 | $\gamma_1$ | 69 |
| 3CPP2 | 4.2 | M-13 | VHR (initial) | 96.16 |
| 3CCP1 | 11 | M-11 | VHR (UV) | 87.24 |
| 3CCV | 29 | M-1 | VHR (Ra) | 96.89 |
| 3CCV1 | 8.5 | M-1 | $t_{-20°\ C.}$ | 19 |
| 2OB(O)OV(2F) | 4 | F-2 | $\tau_{off}$ | 15.6 |
| 4OB(S)OV(2F) | 4 | F-1 | | |
| Total | 100 | | | |

EXAMPLE 4

The liquid crystal composition of Example 4 is prepared according to each compound and weight percentage listed in Table 7 and is tested by filling the same between two substrates of a liquid crystal display device.

TABLE 7

Formulation and test performances of liquid crystal composition

| Code of component | Weight percent | Code of structure | Test results for the performance parameters | |
|---|---|---|---|---|
| 2CPWO2 | 3.5 | N-21 | Cp | 77.6 |
| 3CPWO2 | 6.3 | N-21 | Δn | 0.1145 |
| 3CLWO2 | 7 | N-12 | Δε | -2.95 |
| 2OPWO2 | 5.5 | N-19 | $K_{11}$ | 14.97 |
| 3PWO2 | 6 | N-19 | $K_{33}$ | 15.98 |
| 1PWO2 | 11 | N-19 | $\gamma_1$ | 69 |
| 3CPP2 | 4.2 | M-13 | VHR (initial) | 96.18 |

TABLE 7-continued

Formulation and test performances of liquid crystal composition

| Code of component | Weight percent | Code of structure | Test results for the performance parameters | |
|---|---|---|---|---|
| 3CCP1 | 11 | M-11 | VHR (UV) | 87.27 |
| 3CCV | 29 | M-1 | VHR (Ra) | 96.87 |
| 3CCV1 | 8.5 | M-1 | $t_{-20°\ C.}$ | 18 |
| 2OB(O)OV(2F) | 4 | F-2 | $\tau_{off}$ | 15.7 |
| 4OB(O)OV(2F) | 4 | F-2 | | |
| Total | 100 | | | |

EXAMPLE 5

The liquid crystal composition of Example 5 is prepared according to each compound and weight percentage listed in Table 8 and is tested by filling the same between two substrates of a liquid crystal display device.

TABLE 8

Formulation and test performances of liquid crystal composition

| Code of component | Weight percent | Code of structure | Test results for the performance parameters | |
|---|---|---|---|---|
| 2CPWO2 | 1.5 | N-21 | Cp | 76.6 |
| 3CPWO2 | 3.3 | N-21 | Δn | 0.1142 |
| 3CLWO2 | 5 | N-12 | Δε | -2.95 |
| 2OPWO2 | 5.5 | N-19 | $K_{11}$ | 15.25 |
| 3PWO2 | 6 | N-19 | $K_{33}$ | 16.23 |
| 1PWO2 | 11 | N-19 | $\gamma_1$ | 68.8 |
| 3CPP2 | 7.2 | M-13 | VHR (initial) | 96.89 |
| 3CCP1 | 13 | M-11 | VHR (UV) | 88.13 |
| 3CCV | 29 | M-1 | VHR (Ra) | 97.54 |
| 3CCV1 | 8.5 | M-1 | $t_{-20°\ C.}$ | 19 |
| 2OB(S)C(5, V) | 5 | F-20 | $\tau_{off}$ | 14.9 |
| 4OB(S)OV(2F) | 5 | F-1 | | |
| Total | 100 | | | |

EXAMPLE 6

The liquid crystal composition of Example 6 is prepared according to each compound and weight percentage listed in Table 9 and is tested by filling the same between two substrates of a liquid crystal display device.

TABLE 9

Formulation and test performances of liquid crystal composition

| Code of component | Weight percent | Code of structure | Test results for the performance parameters | |
|---|---|---|---|---|
| 2CPWO2 | 1.5 | N-21 | Cp | 76.6 |
| 3CPWO2 | 3.3 | N-21 | Δn | 0.1143 |
| 3CLWO2 | 5 | N-12 | Δε | -2.95 |
| 2OPWO2 | 5.5 | N-19 | $K_{11}$ | 15.25 |
| 3PWO2 | 6 | N-19 | $K_{33}$ | 16.24 |
| 1PWO2 | 11 | N-19 | $\gamma_1$ | 68.8 |
| 3CPP2 | 7.2 | M-13 | VHR (initial) | 96.87 |
| 3CCP1 | 13 | M-11 | VHR (UV) | 88.11 |
| 3CCV | 29 | M-1 | VHR (Ra) | 97.55 |
| 3CCV1 | 8.5 | M-1 | $t_{-20°\ C.}$ | 20 |
| 4OB(S)O2 | 5 | B-1 | $\tau_{off}$ | 15 |
| 4OB(S)C(5, V) | 5 | F-20 | | |
| Total | 100 | | | |

COMPARATIVE EXAMPLE 2

The liquid crystal composition of Comparative Example 2 is prepared according to each compound and weight percentage listed in Table 10 with 0.3 wt. %

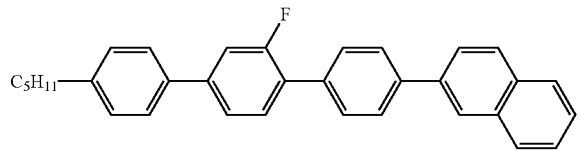

added into the liquid crystal composition of Table 10, and is tested by filling the same between two substrates of a liquid crystal display device.

TABLE 10

Formulation and test performances of liquid crystal composition

| Code of component | Weight percent | Code of structure | Test results for the performance parameters | |
|---|---|---|---|---|
| 2CPWO2 | 6 | N-21 | Cp | 75.4 |
| 3CPWO2 | 9 | N-21 | Δn | 0.1088 |
| 3C1OWO2 | 12 | N-7 | Δε | −3.76 |
| 2CC1OWO2 | 2.5 | N-15 | $K_{11}$ | 15.04 |
| 3CC1OWO2 | 14 | N-15 | $K_{33}$ | 14.56 |
| 2C1OWO2 | 0.5 | N-7 | $\gamma_1$ | 111.1 |
| 3CPP2 | 6 | M-13 | VHR (initial) | 95.76 |
| 3CPP1 | 3 | M-13 | VHR (UV) | 84.24 |
| 3CC2 | 22 | M-1 | VHR (Ra) | 96.14 |
| 4CC3 | 5.5 | M-1 | $t_{-20°\,C.}$ | 13 |
| 5PP1 | 11.5 | M-4 | $\tau_{off}$ | 22.3 |
| 4OB(S)O2 | 4 | B-1 | | |
| 5OB(S)O2 | 4 | B-1 | | |
| Total | 100 | | | |

EXAMPLE 7

The liquid crystal composition of Example 7 is prepared according to each compound and weight percentage listed in Table 11 with 0.3 wt. %

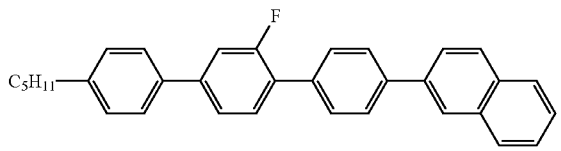

added into the liquid crystal composition of Table 11, and is tested by filling the same between two substrates of a liquid crystal display device.

TABLE 11

Formulation and test performances of liquid crystal composition

| Code of component | Weight percent | Code of structure | Test results for the performance parameters | |
|---|---|---|---|---|
| 2CPWO2 | 6 | N-21 | Cp | 75.4 |
| 3CPWO2 | 9 | N-21 | Δn | 0.1085 |
| 3C1OWO2 | 12 | N-7 | Δε | −3.73 |
| 2CC1OWO2 | 2.5 | N-15 | $K_{11}$ | 15.59 |
| 3CC1OWO2 | 14 | N-15 | $K_{33}$ | 15.04 |
| 2C1OWO2 | 0.5 | N-7 | $\gamma_1$ | 110.8 |
| 3CPP2 | 6 | M-13 | VHR (initial) | 95.65 |
| 3CPP1 | 3 | M-13 | VHR (UV) | 85.05 |
| 3CC2 | 22 | M-1 | VHR (Ra) | 96.33 |
| 4CC3 | 5.5 | M-1 | $t_{-20°\,C.}$ | 16 |
| 5PP1 | 11.5 | M-4 | $\tau_{off}$ | 21.3 |
| 4OB(S)OV(2F) | 4 | F-1 | | |
| 4OB(S)O2 | 4 | B-1 | | |
| Total | 100 | | | |

EXAMPLE 8

The liquid crystal composition of Example 8 is prepared according to each compound and weight percentage listed in Table 12 with 0.3 wt. %

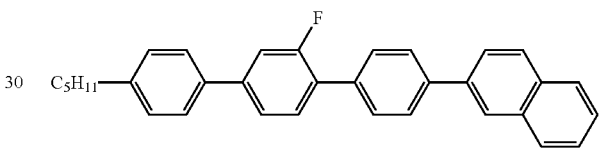

added into the liquid crystal composition of Table 12, and is tested by filling the same between two substrates of a liquid crystal display device.

TABLE 12

Formulation and test performances of liquid crystal composition

| Code of component | Weight percent | Code of structure | Test results for the performance parameters | |
|---|---|---|---|---|
| 2CPWO2 | 6 | N-21 | Cp | 75.4 |
| 3CPWO2 | 9 | N-21 | Δn | 0.1084 |
| 3C1OWO2 | 12 | N-7 | Δε | −3.72 |
| 2CC1OWO2 | 2.5 | N-15 | $K_{11}$ | 15.58 |
| 3CC1OWO2 | 14 | N-15 | $K_{33}$ | 15.05 |
| 2C1OWO2 | 0.5 | N-7 | $\gamma_1$ | 110.7 |
| 3CPP2 | 6 | M-13 | VHR (initial) | 95.67 |
| 3CPP1 | 3 | M-13 | VHR (UV) | 84.98 |
| 3CC2 | 22 | M-1 | VHR (Ra) | 96.36 |
| 4CC3 | 5.5 | M-1 | $t_{-20°C}$ | 15 |
| 5PP1 | 11.5 | M-4 | $\tau_{off}$ | 21 |
| 4OB(O)OV(2F) | 4 | F-2 | | |
| 4OB(S)C(5, V) | 4 | F-20 | | |
| Total | 100 | | | |

It can be seen from the comparison between Examples 7-8 and Comparative Example 2 that the liquid crystal composition of the present invention has a larger K value (value of $K_{11}$ and value of $K_{33}$), a smaller rotational viscosity, a higher VHR value (VHR (UV) and VHR (Ra)), a longer low temperature storage time and a shorter response time while maintaining an appropriate clearing point, an appropriate optical anisotropy, an appropriate absolute value of dielectric anisotropy and an appropriate VHR (initial).

EXAMPLE 9

The liquid crystal composition of Example 9 is prepared according to each compound and weight percentage listed in Table 13 with 0.3 wt. %

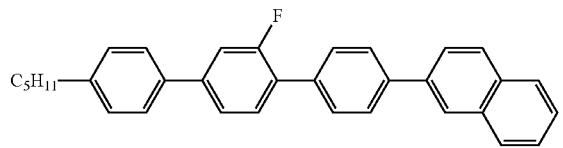

added into the liquid crystal composition of Table 13, and is tested by filling the same between two substrates of a liquid crystal display device.

TABLE 13

Formulation and test performances of liquid crystal composition

| Code of component | Weight percent | Code of structure | Test results for the performance parameters | |
|---|---|---|---|---|
| 2CPWO2 | 7 | N-21 | Cp | 75.8 |
| 3CPWO2 | 6 | N-21 | Δn | 0.1085 |
| 3C1OWO2 | 8.5 | N-7 | Δε | −3.75 |
| 2CC1OWO2 | 2.5 | N-15 | $K_{11}$ | 15.63 |
| 3CC1OWO2 | 11 | N-15 | $K_{33}$ | 15.11 |
| 2C1OWO2 | 1 | N-7 | $\gamma_1$ | 109.7 |
| 3CPP2 | 6 | M-13 | VHR (initial) | 96.24 |
| 3CPP1 | 6 | M-13 | VHR (UV) | 87.03 |
| 3CC2 | 26 | M-1 | VHR (Ra) | 96.98 |
| 4CC3 | 5.5 | M-1 | $t_{-20°C}$ | 18 |
| 5PP1 | 11.5 | M-4 | $\tau_{off}$ | 20.6 |
| 4OB(S)OV(2F) | 3 | F-1 | | |
| 2OB(S)OV(2F) | 3 | F-1 | | |
| 4OB(S)O2 | 3 | B-1 | | |
| Total | 100 | | | |

EXAMPLE 10

The liquid crystal composition of Example 10 is prepared according to each compound and weight percentage listed in Table 14 with 0.3 wt. %

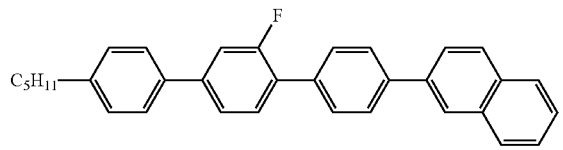

added into the liquid crystal composition of Table 14, and is tested by filling the same between two substrates of a liquid crystal display device.

TABLE 14

Formulation and test performances of liquid crystal composition

| Code of component | Weight percent | Code of structure | Test results for the performance parameters | |
|---|---|---|---|---|
| 2CPWO2 | 7 | N-21 | Cp | 75.5 |
| 3CPWO2 | 6 | N-21 | Δn | 0.1083 |
| 3C1OWO2 | 8.5 | N-7 | Δε | −3.74 |
| 2CC1OWO2 | 2.5 | N-15 | $K_{11}$ | 15.63 |
| 3CC1OWO2 | 11 | N-15 | $K_{33}$ | 15.11 |
| 2C1OWO2 | 1 | N-7 | $\gamma_1$ | 109.8 |
| 3CPP2 | 6 | M-13 | VHR (initial) | 96.31 |
| 3CPP1 | 6 | M-13 | VHR (UV) | 86.98 |
| 3CC2 | 26 | M-1 | VHR (Ra) | 97.02 |
| 4CC3 | 5.5 | M-1 | $t_{-20°C}$ | 19 |
| 5PP1 | 11.5 | M-4 | $\tau_{off}$ | 20.2 |
| 4OB(S)OV(2F) | 3 | F-1 | | |
| 4OB(S)O2 | 3 | B-1 | | |
| 4OB(S)C(5, V) | 3 | F-20 | | |
| Total | 100 | | | |

EXAMPLE 11

The liquid crystal composition of Example 11 is prepared according to each compound and weight percentage listed in Table 15 with 0.3 wt. % added into the liquid crystal composition of Table 15, and is tested by filling the same between two substrates of a liquid crystal display device.

TABLE 15

Formulation and test performances of liquid crystal composition

| Code of component | Weight percent | Code of structure | Test results for the performance parameters | |
|---|---|---|---|---|
| 2CPWO2 | 1 | N-21 | Cp | 75.5 |
| 3CPWO2 | 7 | N-21 | Δn | 0.108 |
| 3C1OWO2 | 6.5 | N-7 | Δε | −3.72 |
| 2CC1OWO2 | 2.5 | N-15 | $K_{11}$ | 15.93 |
| 3CC1OWO2 | 8.5 | N-15 | $K_{33}$ | 15.31 |
| 2C1OWO2 | 2.5 | N-7 | $\gamma_1$ | 108.9 |
| 3CPP2 | 9 | M-13 | VHR (initial) | 97.12 |
| 3CPP1 | 7 | M-13 | VHR (UV) | 88.76 |
| 3CC2 | 26 | M-1 | VHR (Ra) | 97.68 |
| 4CC3 | 7.5 | M-1 | $t_{-20°C}$ | 20 |
| 5PP1 | 11.5 | M-4 | $\tau_{off}$ | 19.4 |
| 4OB(O)OV(2F) | 4 | F-2 | | |
| 2OB(S)C(5, V) | 3 | F-20 | | |
| 2OB(O)OV(2F) | 4 | F-2 | | |
| Total | 100 | | | |

EXAMPLE 12

The liquid crystal composition of Example 12 is prepared according to each compound and weight percentage listed in Table 16 with 0.3 wt. %

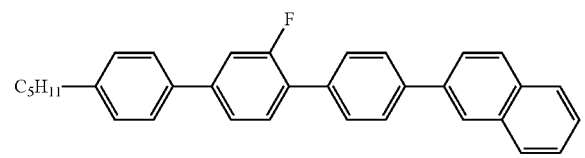

added into the liquid crystal composition of Table 16, and is tested by filling the same between two substrates of a liquid crystal display device.

TABLE 16

Formulation and test performances of liquid crystal composition

| Code of component | Weight percent | Code of structure | Test results for the performance parameters | |
|---|---|---|---|---|
| 2CPWO2 | 1 | N-21 | Cp | 75.5 |
| 3CPWO2 | 7 | N-21 | Δn | 0.1087 |
| 3C1OWO2 | 6.5 | N-7 | Δε | −3.73 |
| 2CC1OWO2 | 2.5 | N-15 | $K_{11}$ | 15.94 |
| 3CC1OWO2 | 11 | N-15 | $K_{33}$ | 15.32 |
| 3CPP2 | 6 | M-13 | $γ_1$ | 108.7 |
| 3CPP1 | 3 | M-13 | VHR (initial) | 96.98 |
| 3CC2 | 26 | M-1 | VHR (UV) | 88.75 |
| 4CC3 | 7.5 | M-1 | VHR (Ra) | 97.65 |
| 5PP1 | 11.5 | M-4 | $t_{-20°C}$ | 20 |
| 5OB(S)O2 | 6 | B-1 | $τ_{off}$ | 19.5 |
| 2OB(O)C(5, V) | 6 | F-21 | | |
| 4OB(S)C(5, V) | 6 | F-20 | | |
| Total | 100 | | | |

COMPARATIVE EXAMPLE 3

The liquid crystal composition of Comparative Example 3 is prepared according to each compound and weight percentage listed in Table 17 with 0.3 wt. %

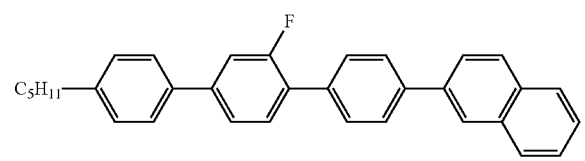

added into the liquid crystal composition of Table 17, and is tested by filling the same between two substrates of a liquid crystal display device.

TABLE 17

Formulation and test performances of liquid crystal composition

| Code of component | Weight percent | Code of structure | Test results for the performance parameters | |
|---|---|---|---|---|
| 3CWO2 | 6 | N-2 | Cp | 75.6 |
| 5CWO2 | 8 | N-2 | Δn | 0.093 |
| 2CPWO2 | 7 | N-21 | Δε | −2.2 |
| 3CWO4 | 4.5 | N-2 | $K_{11}$ | 12.5 |
| 3CCWO2 | 10 | N-9 | $K_{33}$ | 14.1 |

TABLE 17-continued

Formulation and test performances of liquid crystal composition

| Code of component | Weight percent | Code of structure | Test results for the performance parameters | |
|---|---|---|---|---|
| 4CCWO2 | 6 | N-9 | $γ_1$ | 89 |
| 3CPO2 | 10.5 | M-2 | VHR (initial) | 95.56 |
| 3CPP2 | 13 | M-13 | VHR (UV) | 84.44 |
| 3CC2 | 20 | M-1 | VHR (Ra) | 95.84 |
| 4CC3 | 9 | M-1 | $t_{-20°C}$ | 13 |
| 4OB(S)O2 | 2 | B-1 | $τ_{off}$ | 20.3 |
| 5OB(S)O2 | 2 | B-1 | | |
| 3OB(S)O3 | 2 | B-1 | | |
| Total | 100 | | | |

EXAMPLE 13

The liquid crystal composition of Example 13 is prepared according to each compound and weight percentage listed in Table 18 with 0.3 wt. %

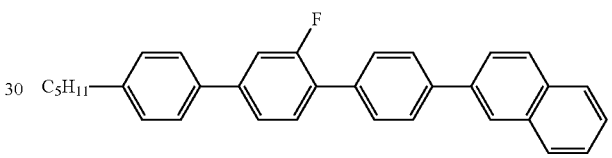

added into the liquid crystal composition of Table 18, and is tested by filling the same between two substrates of a liquid crystal display device.

TABLE 18

Formulation and test performances of liquid crystal composition

| Code of component | Weight percent | Code of structure | Test results for the performance parameters | |
|---|---|---|---|---|
| 3CWO2 | 4.5 | N-2 | Cp | 75.75 |
| 5CWO2 | 8 | N-2 | Δn | 0.0928 |
| 2CPWO2 | 5 | N-21 | Δε | −2.16 |
| 3CWO4 | 4.5 | N-2 | $K_{11}$ | 12.8 |
| 3CCWO2 | 10 | N-9 | $K_{33}$ | 14.5 |
| 4CCWO2 | 5 | N-9 | $γ_1$ | 88.2 |
| 3CPO2 | 11.5 | M-2 | VHR (initial) | 95.65 |
| 3CPP2 | 12.5 | M-13 | VHR (UV) | 85.12 |
| 3CC2 | 20 | M-1 | VHR (Ra) | 96.15 |
| 4CC3 | 9 | M-1 | $t_{-20°C}$ | 16 |
| 2OB(S)C(5, V) | 3 | F-20 | $τ_{off}$ | 19.3 |
| 4OB(S)C(5, V) | 4 | F-20 | | |
| 4OB(O)C(5, V) | 3 | F-21 | | |
| Total | 100 | | | |

It can be seen from the comparison between Example 13 and Comparative Example 3 that the liquid crystal composition of the present invention has a larger K value (value of $K_{11}$ and value of $K_{33}$), a smaller rotational viscosity, a higher VHR value (VHR (initial), VHR (UV), VHR (Ra)), a longer low temperature storage time and a shorter response time while maintaining an appropriate clearing point, an appropriate optical anisotropy, and an appropriate absolute value of dielectric anisotropy.

EXAMPLE 14

The liquid crystal composition of Example 14 is prepared according to each compound and weight percentage listed in Table 19 with 0.3 wt. %

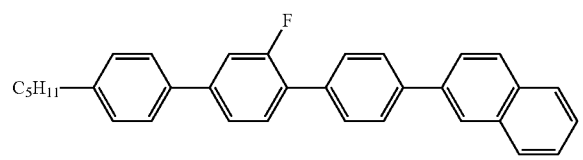

added into the liquid crystal composition of Table 19, and is tested by filling the same between two substrates of a liquid crystal display device.

TABLE 19

Formulation and test performances of liquid crystal composition

| Code of component | Weight percent | Code of structure | Test results for the performance parameters | |
|---|---|---|---|---|
| 3CWO2 | 4.5 | N-2 | Cp | 75.95 |
| 5CWO2 | 3 | N-2 | Δn | 0.0932 |
| 2CPWO2 | 6 | N-21 | Δε | −2.19 |
| 3CWO4 | 2.5 | N-2 | $K_{11}$ | 13.2 |
| 3CCWO2 | 10 | N-9 | $K_{33}$ | 14.9 |
| 4CCWO2 | 1.5 | N-9 | $\gamma_1$ | 87.3 |
| 3CPO2 | 15 | M-2 | VHR (initial) | 96.16 |
| 3CPP2 | 11.5 | M-13 | VHR (UV) | 87.24 |
| 3CC2 | 20 | M-1 | VHR (Ra) | 96.89 |
| 4CC3 | 14 | M-1 | $t_{-20°C}$ | 15 |
| 2OB(O)C(5, V) | 4 | F-21 | $\tau_{off}$ | 18.4 |
| 4OB(O)C(5, V) | 4 | F-21 | | |
| 4OB(O)OV(2F) | 4 | F-2 | | |
| Total | 100 | | | |

EXAMPLE 15

The liquid crystal composition of Example 15 is prepared according to each compound and weight percentage listed in Table 20 with 0.3 wt. %

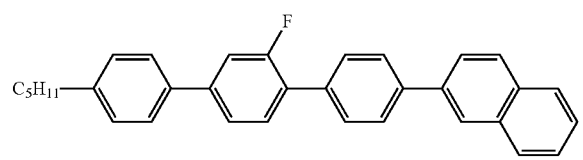

added into the liquid crystal composition of Table 20, and is tested by filling the same between two substrates of a liquid crystal display device.

TABLE 20

Formulation and test performances of liquid crystal composition

| Code of component | Weight percent | Code of structure | Test results for the performance parameters | |
|---|---|---|---|---|
| 3CWO2 | 5 | N-2 | Cp | 75.15 |
| 2CPWO2 | 4 | N-21 | Δn | 0.093 |
| 3CWO4 | 4.5 | N-2 | Δε | −2.17 |
| 3CCWO2 | 8 | N-9 | $K_{11}$ | 13.6 |
| 4CCWO2 | 2.5 | N-9 | $K_{33}$ | 15.3 |

TABLE 20-continued

Formulation and test performances of liquid crystal composition

| Code of component | Weight percent | Code of structure | Test results for the performance parameters | |
|---|---|---|---|---|
| 3CPO2 | 12 | M-2 | $\gamma_1$ | 86.8 |
| 3CPP2 | 11.5 | M-13 | VHR (initial) | 96.06 |
| 3CC2 | 20 | M-1 | VHR (UV) | 87.14 |
| 4CC3 | 16.5 | M-1 | VHR (Ra) | 96.79 |
| 4OB(S)OV(2F) | 5 | F-1 | $t_{-20°C}$ | 19 |
| 4OB(O)C(5, V) | 5 | F-21 | $\tau_{off}$ | 18 |
| 4OB(S)O2 | 6 | B-1 | | |
| Total | 100 | | | |

EXAMPLE 16

The liquid crystal composition of Example 16 is prepared according to each compound and weight percentage listed in Table 21 and is tested by filling the same between two substrates of a liquid crystal display device.

TABLE 21

Formulation and test performances of liquid crystal composition

| Code of component | Weight percent | Code of structure | Test results for the performance parameters | |
|---|---|---|---|---|
| 3CCV | 40.5 | M-1 | Cp | 76.15 |
| 1PWO2 | 5.5 | N-19 | Δn | 0.1082 |
| 2PWO2 | 6 | N-19 | Δε | −4.31 |
| 3CWO2 | 3.5 | N-2 | $K_{11}$ | 14.85 |
| 3CLWO2 | 9 | N-12 | $K_{33}$ | 14.28 |
| 2OB(S)OV(2F) | 6 | F-1 | $\gamma_1$ | 85.89 |
| 4OB(S)OV(2F) | 4 | F-1 | VHR (initial) | 95.95 |
| 3CPWO2 | 5 | N-21 | VHR (UV) | 85.87 |
| 4CLWO2 | 7.5 | N-12 | VHR (Ra) | 96.87 |
| 3CLWO3 | 8.5 | N-12 | $t_{-20°C}$ | 17 |
| 3CPP2 | 4.5 | M-13 | $\tau_{off}$ | 15.5 |
| Total | 100 | | | |

EXAMPLE 17

The liquid crystal composition of Example 17 is prepared according to each compound and weight percentage listed in Table 22 and is tested by filling the same between two substrates of a liquid crystal display device.

TABLE 22

Formulation and test performances of liquid crystal composition

| Code of component | Weight percent | Code of structure | Test results for the performance parameters | |
|---|---|---|---|---|
| 3CCV | 40.5 | M-1 | Cp | 76.77 |
| 1PWO2 | 5.5 | N-19 | Δn | 0.1082 |
| 2PWO2 | 6 | N-19 | Δε | −4.32 |
| 3CWO2 | 3.5 | N-2 | $K_{11}$ | 14.83 |
| 3CLWO2 | 9 | N-12 | $K_{33}$ | 14.26 |
| 2OB(O)OV(2F) | 6 | F-2 | $\gamma_1$ | 85.9 |
| 4OB(O)OV(2F) | 4 | F-2 | VHR (initial) | 95.98 |
| 3CPWO2 | 5 | N-21 | VHR (UV) | 85.86 |
| 4CLWO2 | 7.5 | N-12 | VHR (Ra) | 96.85 |
| 3CLWO3 | 8.5 | N-12 | $t_{-20°C}$ | 18 |
| 3CPP2 | 4.5 | M-13 | $\tau_{off}$ | 15.3 |
| Total | 100 | | | |

EXAMPLE 18

The liquid crystal composition of Example 18 is prepared according to each compound and weight percentage listed in Table 23 and is tested by filling the same between two substrates of a liquid crystal display device.

TABLE 23

Formulation and test performances of liquid crystal composition

| Code of component | Weight percent | Code of structure | Test results for the performance parameters | |
|---|---|---|---|---|
| 3CCV | 41.5 | M-1 | Cp | 76.27 |
| 1PWO2 | 5.5 | N-19 | Δn | 0.1085 |
| 2PWO2 | 6 | N-19 | Δε | −4.32 |
| 3CWO2 | 2 | N-2 | $K_{11}$ | 14.96 |
| 3CLWO2 | 8 | N-12 | $K_{33}$ | 14.38 |
| 2OB(S)OV(2F) | 6 | F-1 | $\gamma_1$ | 85.85 |
| 4OB(S)OV(2F) | 6 | F-1 | VHR (initial) | 96.79 |
| 3CPWO2 | 0.5 | N-21 | VHR (UV) | 87.34 |
| 4CLWO2 | 7.5 | N-12 | VHR (Ra) | 97.32 |
| 3CLWO3 | 8 | N-12 | $t_{-20°C}$ | 19 |
| 3CPP2 | 9 | M-13 | $\tau_{off}$ | 14.7 |
| Total | 100 | | | |

EXAMPLE 19

The liquid crystal composition of Example 19 is prepared according to each compound and weight percentage listed in Table 24 and is tested by filling the same between two substrates of a liquid crystal display device.

TABLE 24

Formulation and test performances of liquid crystal composition

| Code of component | Weight percent | Code of structure | Test results for the performance parameters | |
|---|---|---|---|---|
| 3CCV | 41.5 | M-1 | Cp | 76.27 |
| 1PWO2 | 5.5 | N-19 | Δn | 0.1085 |
| 2PWO2 | 6 | N-19 | Δε | −4.33 |
| 3CWO2 | 2 | N-2 | $K_{11}$ | 14.94 |
| 3CLWO2 | 8 | N-12 | $K_{33}$ | 14.37 |
| 2OB(S)C(5, V) | 6 | F-20 | $\gamma_1$ | 85.86 |
| 4OB(S)C(5, V) | 6 | F-20 | VHR (initial) | 96.81 |
| 3CPWO2 | 0.5 | N-21 | VHR (UV) | 87.23 |
| 4CLWO2 | 7.5 | N-12 | VHR (Ra) | 97.35 |
| 3CLWO3 | 8 | N-12 | $t_{-20°C}$ | 20 |
| 3CPP2 | 9 | M-13 | $\tau_{off}$ | 14.8 |
| Total | 100 | | | |

In conclusion, the liquid crystal composition of the present invention has a larger K value, a smaller rotational viscosity, a higher VHR value, a longer low temperature storage time and a shorter response time while maintaining an appropriate clearing point, an appropriate optical anisotropy, and an appropriate absolute value of dielectric anisotropy, such that the liquid crystal display device comprising the liquid crystal composition has a better contrast, a wider temperature range for application, a faster response speed, a better contrast and a higher reliability.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

We claim:
1. A liquid crystal composition comprising:
at least one compound of general formula F

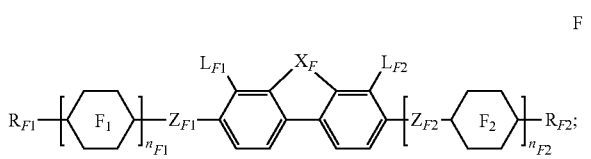

and
at least one compound of general formula N in an amount of 10%-45% by weight of the total weight of the liquid crystal composition

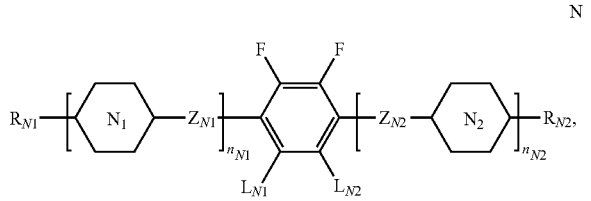

wherein,
$R_{F1}$ represents —H, halogen, $C_{1-12}$ linear alkyl, or $C_{3-12}$ branched alkyl,

one or more nonadjacent —$CH_2$— in the $C_{1-12}$ alkyl linear or the $C_{3-12}$ branched alkyl can each be independently replaced by —C≡C—, —O—, —CO—, —CO—O— or —O—CO—, and one or more —H in the $C_{1-12}$ alkyl linear or the $C_{3-12}$ branched alkyl can each be independently substituted by —F or —Cl;
$R_{F2}$ represents

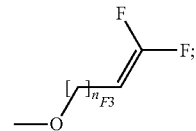

$R_{N1}$ and $R_{N2}$ each independently represents $C_{1-12}$ linear alkyl, or $C_{3-12}$ branched alkyl,

one or more nonadjacent —$CH_2$— in the $C_{1-12}$ alkyl linear or the $C_{3-12}$ branched alkyl can each be independently replaced by —CH=CH—, —C≡C—, —O—, —CO—, —CO—O— or —O—CO—;

ring

and ring

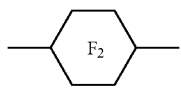

each independently represents

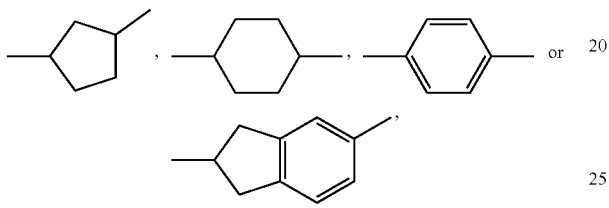 or wherein one or more —CH$_2$— in

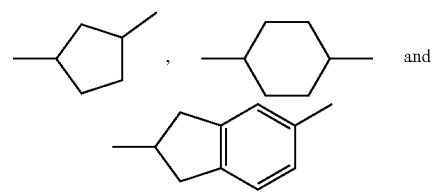 and can be replaced by —O—, one or more single bond in the rings can be replaced by double bond, wherein one or more —H on

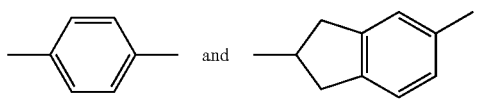

can each be independently substituted by —CN, —F or —Cl, and one or more —CH= in the rings can be replaced by —N=;

ring

and ring

each independently represents

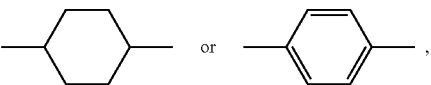, wherein one or more —CH$_2$— in

can be replaced by —O—, one or more single bond in the rings can be replaced by double bond, wherein one or more —H on

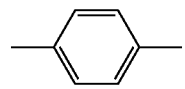

can be substituted by —F, —Cl or —CN, and one or more —CH= in the rings can be replaced by —N=;

$X_F$ represents —O—, —S— or —CO—;

$L_{F1}$ and $L_{F2}$ each independently represents —H, —F, —Cl, —CF$_3$ or —OCF$_3$;

$L_{N1}$ and $L_{N2}$ each independently represents —H, C$_{1-3}$ alkyl or halogen;

$Z_{F1}$, $Z_{F2}$, $Z_{F4}$, $Z_{N1}$ and $Z_{N2}$ each independently represents single bond, —O—, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;

$n_{F1}$ and $n_{F2}$ each independently represents 0, 1 or 2, wherein, when $n_{F1}$ represents 2, ring

can be same or different, when $n_{F2}$ represents 2, ring

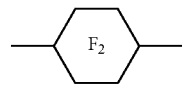

can be same or different, and $Z_{F2}$ can be same or different;

$n_{F3}$ represents an integer of 0-4; and $n_{N1}$ represents 0, 1, 2 or 3, $n_{N2}$ represents 0 or 1, and $0 \leq n_{N1}+n_{N2} \leq 3$, when $n_{N1}$=2 or 3, ring

can be same or different, and $Z_{N1}$ can be same or different.

2. The liquid crystal composition according to claim 1, wherein the compound of general formula F is selected from a group consisting of the following compounds:
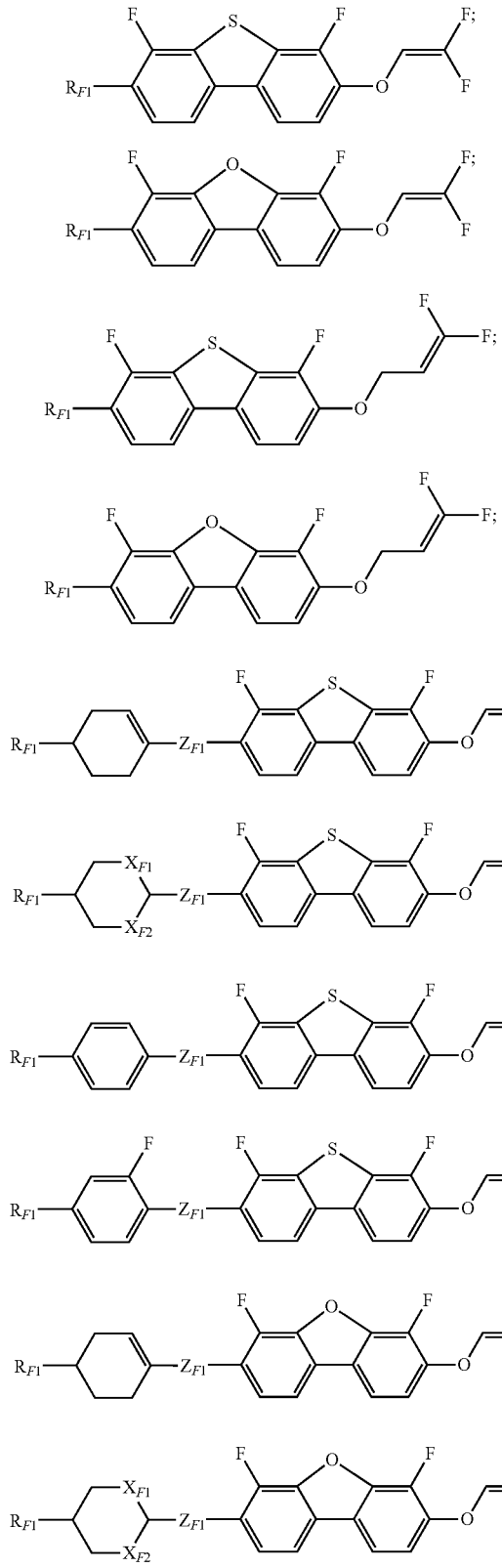
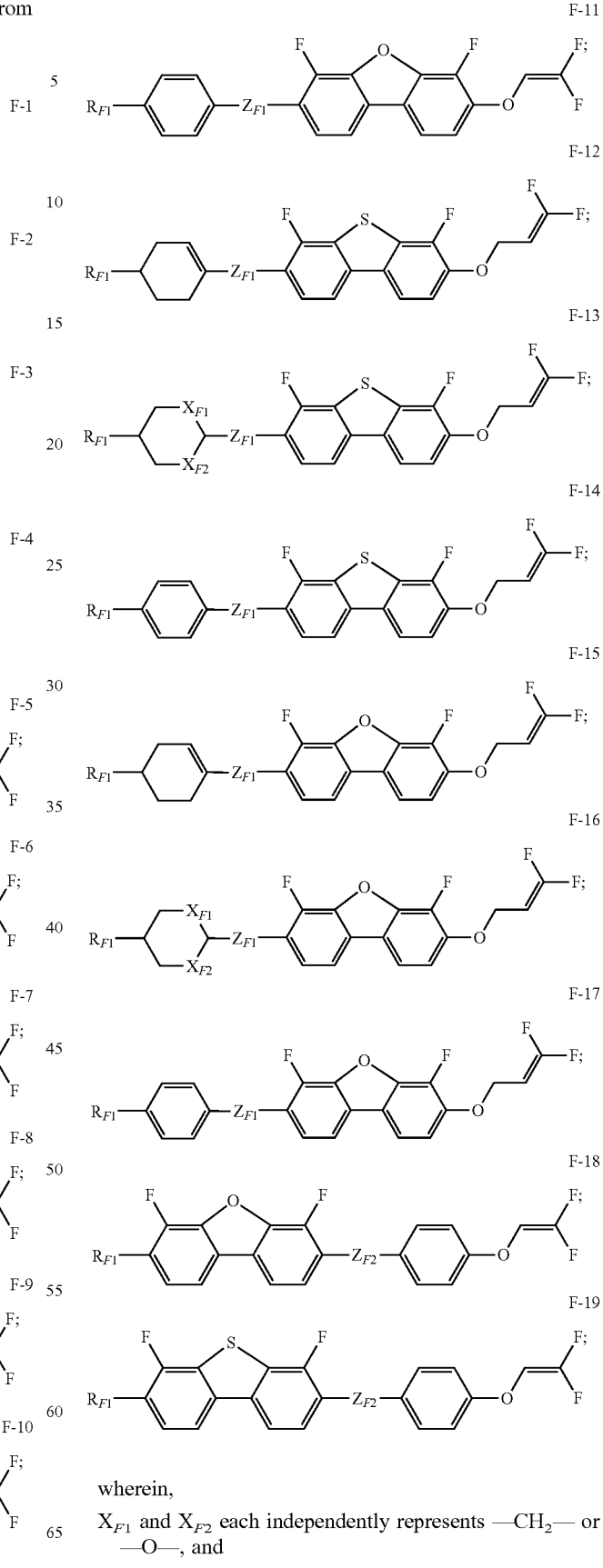
wherein,
$X_{F1}$ and $X_{F2}$ each independently represents —$CH_2$— or —O—, and
$R_{F1}$, $Z_{F1}$, and $Z_{F2}$ are as defined in claim 1.

3. The liquid crystal composition according to claim 1, wherein the compound of general formula N is selected from a group consisting of the following compounds:
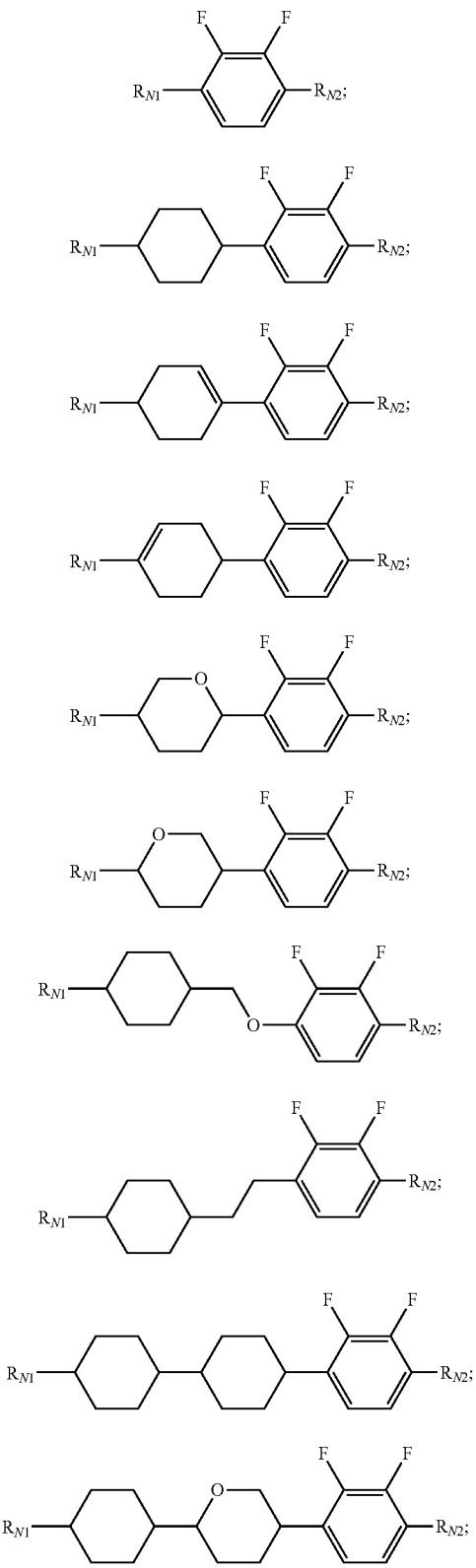

-continued

N-22
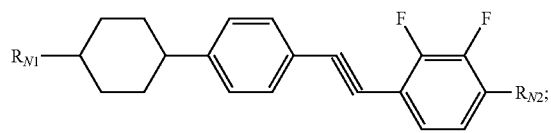

N-23
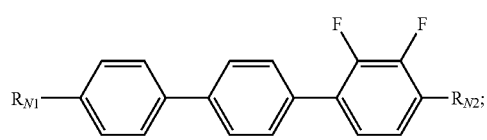

N-24
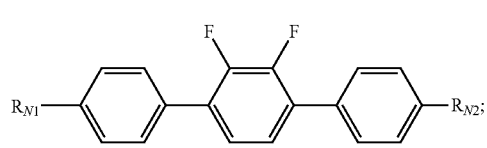

N-25
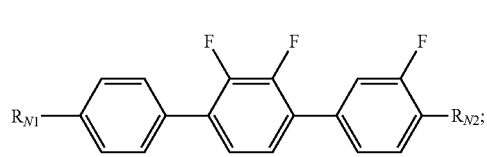

N-26
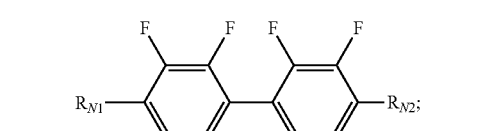

N-27
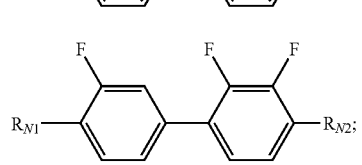

N-28

N-29
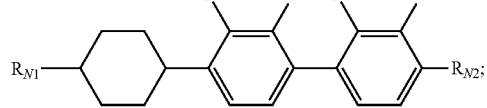

N-30
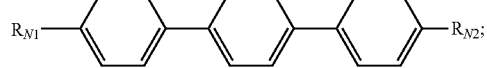

N-31
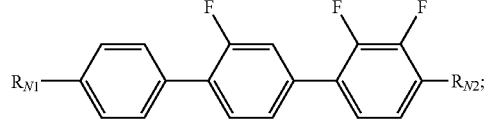

N-32
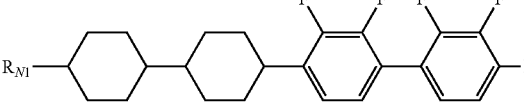

-continued

N-33
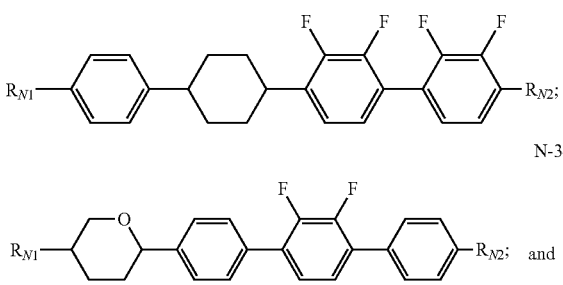

N-34

N-35
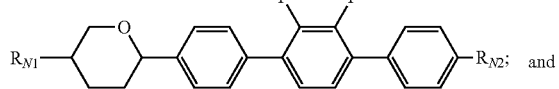

wherein $R_{N1}$ and $R_{N2}$ are as defined in claim 1.

4. The liquid crystal composition according to claim 1, wherein the liquid crystal composition comprises at least one compound of general formula M

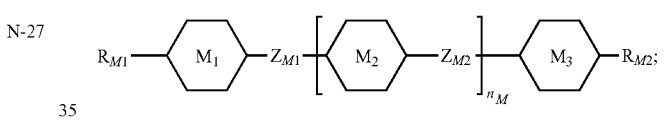

M wherein, $R_{M1}$ and $R_{M2}$ each independently represents $C_{1-12}$ linear alkyl, or $C_{3-12}$ branched alkyl,

one or more nonadjacent —$CH_2$— in the $C_{1-12}$ alkyl linear or the $C_{3-12}$ branched alkyl can each be independently replaced by —CH=CH—, —C≡C—, —O—, —CO—, —CO—O— or —O—CO—;

ring

ring

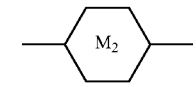

and ring

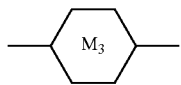

each independently represents

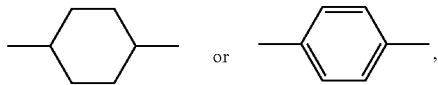

wherein one or more —CH$_2$— in

can be replaced by —O—, one or more single bond in the rings can be replaced by double bond, at most one —H on

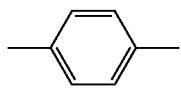

can be substituted by halogen;

$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and $n_M$ represents 0, 1 or 2, wherein when $n_M$=2, ring

can be same or different, and $Z_{M2}$ can be same or different.

5. The liquid crystal composition according to claim 4, wherein the compound of general formula M is selected from a group consisting of the following compounds:

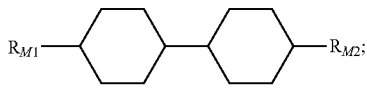
M-1

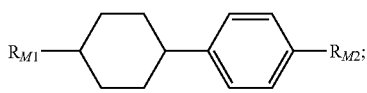
M-2

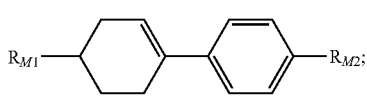
M-3

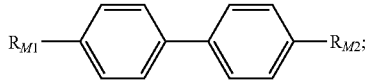
M-4

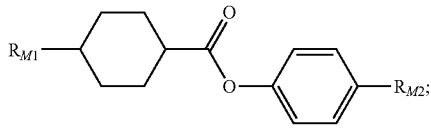
M-5

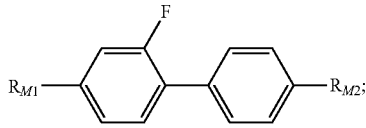
M-6

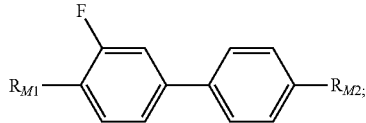
M-7

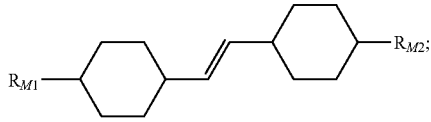
M-8

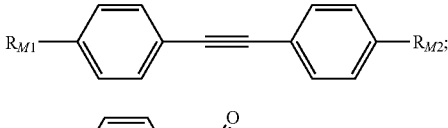
M-9

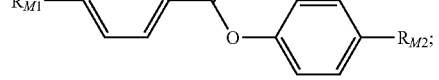
M-10

M-11

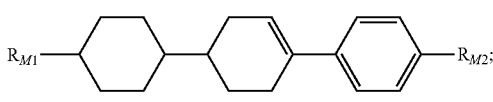
M-12

M-13

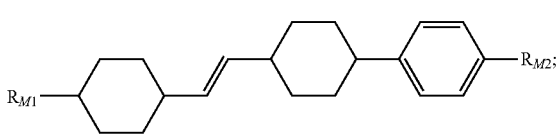
M-14

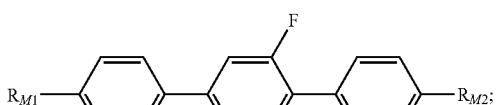
M-15

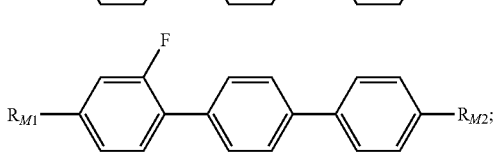
M-16

M-17
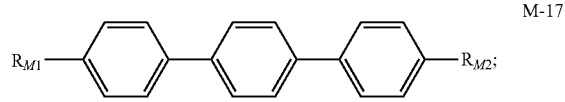

M-18
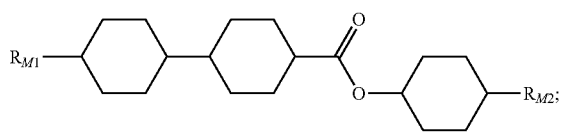

M-19
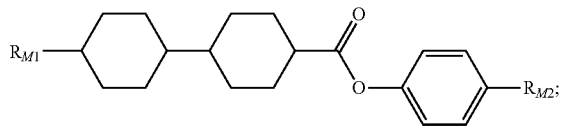

M-20
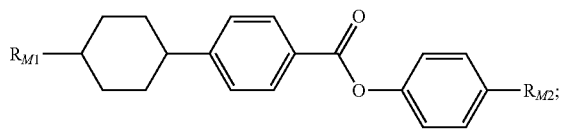

M-21
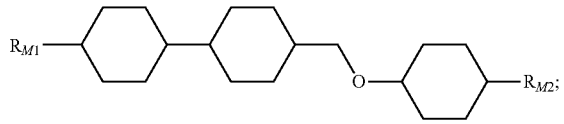

M-22
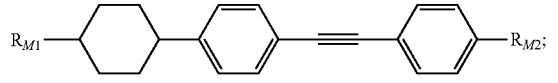

M-23
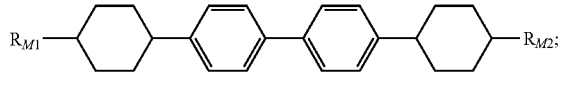

M-24
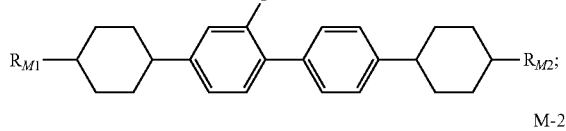

M-25
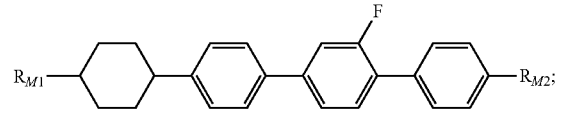

M-26
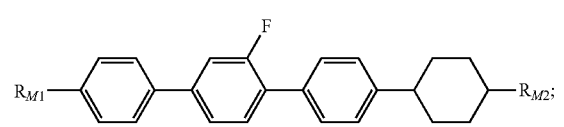

M-27
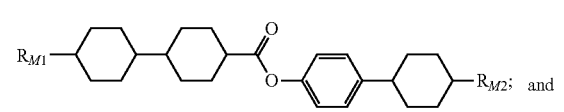 and

M-28
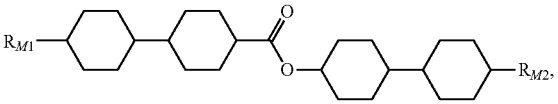

wherein $R_{M1}$ and $R_{M2}$ are as defined in claim 4.

6. The liquid crystal composition according to claim 4, wherein the liquid crystal composition comprises at least one compound of general formula B B
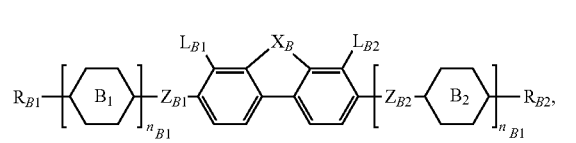

wherein, $R_{B1}$ and $R_{B2}$ each independently represents halogen, —CF$_3$, —OCF$_3$, C$_{1-12}$ linear alkyl, or C$_{3-12}$ branched alkyl,

one or more nonadjacent —CH$_2$— in the C$_{1-12}$ alkyl linear or the C$_{3-12}$ branched alkyl,

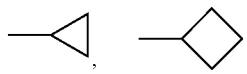

can each be independently replaced by —C≡C—, —O—, —CO—, —CO—O— or —O—CO—;

ring

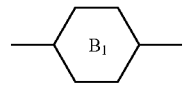

and ring

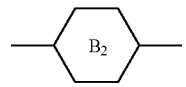

each independently represents

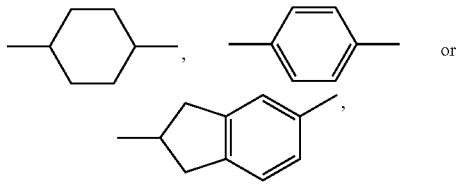

wherein one or more —CH$_2$— in

 and 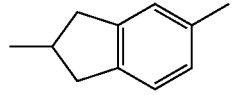

can be replaced by —O—, one or more single bond in the rings can be replaced by double bond, wherein one or more —H on

 and 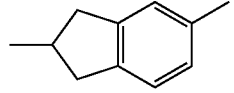

can each be independently substituted by —CN, —F or —Cl, and one or more —CH= in the rings can be replaced by —N=;

$X_B$ represents —O—, —S— or —CO—;

$L_{B1}$ and $L_{B2}$ each independently represents —H, —F, —Cl, —CF$_3$ or —OCF$_3$;

$Z_{B1}$ and $Z_{B2}$ each independently represents single bond, —O—, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—; and $n_{B1}$ and $n_{B2}$ each independently represents 0, 1 or 2, wherein, when $n_{B1}$ represents 2, ring

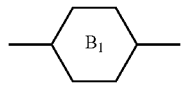

can be same or different, when $n_{B2}$ represents 2, ring

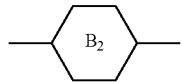

can be same or different, and $Z_{B2}$ can be same or different.

7. The liquid crystal composition according to claim 6, wherein the compound of general formula B is selected from a group consisting of the following compounds:

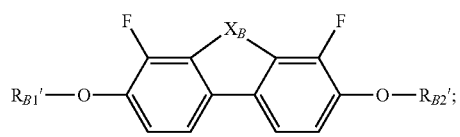
B-1

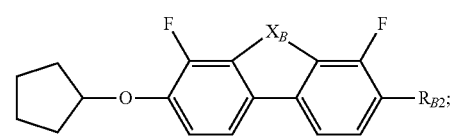
B-2

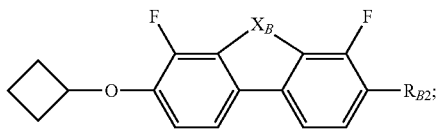
B-3

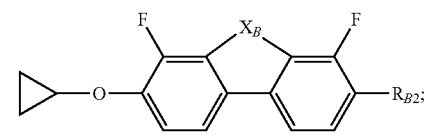
B-4

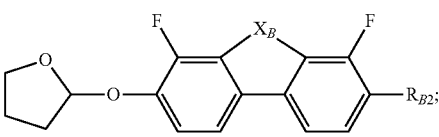
B-5

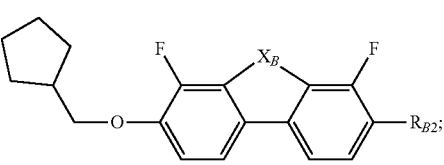
B-6

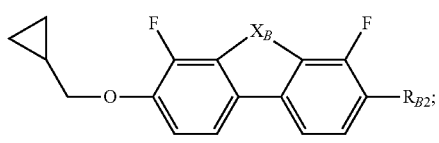
B-7

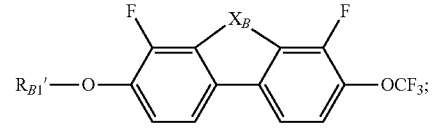
B-8

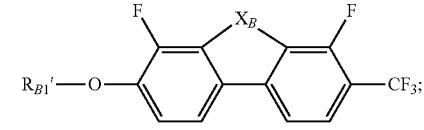
B-9

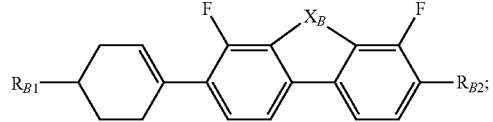
B-10

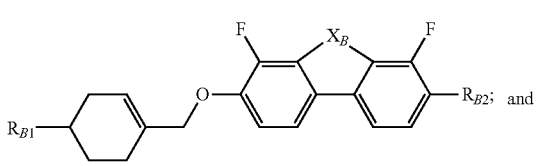
B-11 and

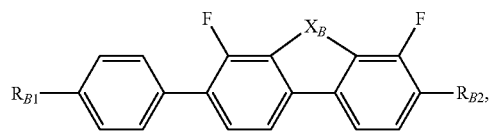
B-12 wherein,
$R_{B1}'$ and $R_{B2}'$ each independently represents C$_{1-11}$ linear alkyl or C$_{3-11}$ branched alkyl, and
wherein $R_{B1}$, $R_{B2}$, and $X_B$ are as defined in claim 6.

8. The liquid crystal composition according to claim 6, wherein the compound of general formula F provides 0.1-30 wt. % of the total weight of the liquid crystal composition; the compound of general formula M provides 0.1-70 wt. % of the total weight of the liquid crystal composition; and the compound of general formula B provides 0.1-30 wt. % of the total weight of the liquid crystal composition.

9. The liquid crystal composition according to claim 1, wherein the liquid crystal composition comprises at least one additive.

10. A liquid crystal display device comprising the liquid crystal composition of claim 1.

11. The liquid crystal composition according to claim 1, further comprising at least one the following compounds:

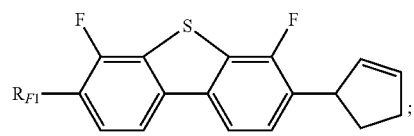

F-20

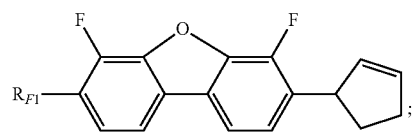

F-21

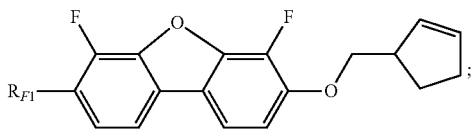

F-22

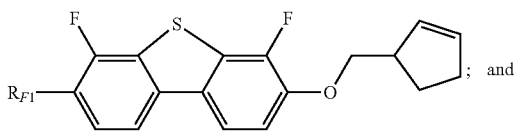

F-23 ; and

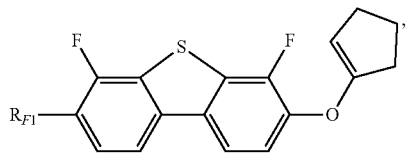

F-24 wherein $R_{F1}$ is as defined in claim 1.

* * * * *